US012799402B2

(12) United States Patent
Schjødt et al.

(10) Patent No.: US 12,799,402 B2
(45) **Date of Patent: *Nov. 17, 2026**

(54) PROCESS AND PLANT FOR CONVERSION OF OXYGENATES

(71) Applicant: Topsoe A/S, Kgs. Lyngby (DK)

(72) Inventors: Niels Christian Schjødt, Hvalsø (DK); Pablo Beato, Nordhavn (DK); Finn Joensen, Hørsholm (DK); Rasmus Yding Brogaard, Kgs. Lyngby (DK); Linn Edda Sommer, Copenhagen OE (DK)

(73) Assignee: TOPSOE A/S, Kgs. Lyngby (DK)

( * ) Notice: Subject to any disclaimer, the term of this patent is extended or adjusted under 35 U.S.C. 154(b) by 192 days.

This patent is subject to a terminal disclaimer.

(21) Appl. No.: 18/727,130

(22) PCT Filed: Dec. 22, 2022

(86) PCT No.: PCT/EP2022/087475

§ 371 (c)(1),
(2) Date: Jul. 8, 2024

(87) PCT Pub. No.: WO2023/138876

PCT Pub. Date: Jul. 27, 2023

(65) Prior Publication Data

US 2025/0084315 A1 Mar. 13, 2025

(30) Foreign Application Priority Data

Jan. 21, 2022 (EP) .................................... 22152691

(51) Int. Cl.

*C10G 3/00* (2006.01)
*B01D 3/06* (2006.01)

(Continued)

(52) U.S. Cl.

CPC ................ *C10G 3/49* (2013.01); *B01D 3/06* (2013.01); *B01J 23/72* (2013.01); *B01J 23/755* (2013.01);

(Continued)

(58) Field of Classification Search

None

See application file for complete search history.

(56) References Cited

U.S. PATENT DOCUMENTS 4,021,502 A 5/1977 Plank et al.
4,211,640 A 7/1980 Garwood et al.

(Continued)

FOREIGN PATENT DOCUMENTS

CA 3090050 A1 8/2019
CN 104059682 A 9/2014

(Continued)

OTHER PUBLICATIONS

International Search Report mailed on Feb. 2, 2023, by the European Patent Office for International Application No. PCT/EP2022/087475, 4 Pages.

(Continued)

*Primary Examiner* — Vishal V Vasisth
(74) *Attorney, Agent, or Firm* — Boone IP Law

(57) ABSTRACT

A process for producing a C3 olefin product stream and a hydrocarbon stream comprising hydrocarbons boiling in the jet fuel range, the process comprising: passing a feedstock stream comprising oxygenates over a catalyst active in the conversion of oxygenates for producing a first olefin stream; conducting the first olefin stream to a first separation step and withdrawing thereof a liquid hydrocarbon fraction comprising at least 50 wt % of the C3-olefins contained in the first olefin stream; conducting the liquid hydrocarbon fraction to a fractionation step and separating therefrom said C3

(Continued)

olefin product stream and the olefin product stream; and converting the olefin product stream into the hydrocarbon stream comprising hydrocarbons boiling in the jet fuel range, particularly sustainable aviation fuel (SAF), by subsequent oligomerization and hydrogenation. The invention provides also a plant for conducting the process.

19 Claims, 5 Drawing Sheets

(51) Int. Cl.

| | |
|---|---|
| ***B01J 23/72*** | (2006.01) |
| ***B01J 23/755*** | (2006.01) |
| ***B01J 29/40*** | (2006.01) |
| ***B01J 29/70*** | (2006.01) |

(52) U.S. Cl.

CPC .......... *B01J 29/40* (2013.01); *B01J 29/7007* (2013.01); *B01J 29/703* (2013.01); *C10G 2400/08* (2013.01); *C10G 2400/20* (2013.01)

(56) References Cited

U.S. PATENT DOCUMENTS

| | | | |
|---|---|---|---|
| 4,227,992 | A | 10/1980 | Garwood et al. |
| 4,433,185 | A | 2/1984 | Tabak |
| 4,456,779 | A | 6/1984 | Owen et al. |
| 4,476,338 | A | 10/1984 | Chang |
| 4,482,772 | A | 11/1984 | Tabak |
| 4,523,046 | A | 6/1985 | Gould et al. |
| 4,613,719 | A | 9/1986 | Kukes et al. |
| 4,684,757 | A | 8/1987 | Avidan et al. |
| 4,740,645 | A | 4/1988 | Garwood et al. |
| 4,851,606 | A | 7/1989 | Ragonese |
| 4,898,717 | A | 2/1990 | Hsia et al. |
| 5,146,032 | A | 9/1992 | Harandi |
| 5,177,279 | A | 1/1993 | Harandi |
| 5,254,767 | A | 10/1993 | Dwyer |
| 5,268,515 | A | 12/1993 | Irvine |
| 6,372,949 | B1 | 4/2002 | Brown et al. |
| 6,403,854 | B1 | 6/2002 | Miller |
| 7,482,300 | B2 | 1/2009 | Lai et al. |
| 8,198,338 | B2 | 6/2012 | Shulenberger |
| 8,524,970 | B2 | 9/2013 | Rothaemel et al. |
| 9,505,670 | B2 | 11/2016 | Vijayakumari |
| 9,957,449 | B2 | 5/2018 | Luebke et al. |
| 11,060,036 | B2 | 7/2021 | Sorensen |
| 11,492,310 | B2 | 11/2022 | Olayiwola |
| 2002/0103406 | A1 | 8/2002 | Mathys et al. |
| 2006/0161035 | A1 | 7/2006 | Kalnes |
| 2007/0131581 | A1 | 6/2007 | Lai et al. |
| 2009/0187057 | A1 | 7/2009 | Chewter et al. |
| 2010/0305376 | A1 | 12/2010 | Rothaemel et al. |
| 2011/0112314 | A1 | 5/2011 | Chewter |
| 2012/0271081 | A1 | 10/2012 | Nesterenko et al. |
| 2014/0018593 | A1 | 1/2014 | Birke |
| 2015/0191666 | A1 | 7/2015 | Bradin |
| 2016/0145169 | A1 | 5/2016 | Rothaemel |
| 2016/0312131 | A1 | 10/2016 | Luebke et al. |
| 2017/0121237 | A1 | 5/2017 | Ilias et al. |
| 2018/0155631 | A1 | 6/2018 | O'Neill et al. |
| 2018/0155637 | A1 | 6/2018 | Mccarthy et al. |
| 2019/0176136 | A1 | 6/2019 | Beato |
| 2020/0056106 | A1 | 2/2020 | Deimund et al. |
| 2020/0231880 | A1 | 7/2020 | Rajagopalan |
| 2020/0399190 | A1 | 12/2020 | Behkish |
| 2024/0010938 | A1 | 1/2024 | Hidalgo Vivas |
| 2024/0301296 | A1 | 9/2024 | Ingram |

FOREIGN PATENT DOCUMENTS

| | | | |
|---|---|---|---|
| CN | 107963953 | A | 4/2018 |
| CN | 108970638 | A | 12/2018 |
| CN | 110023458 | A | 7/2019 |
| CN | 111111765 | A | 5/2020 |
| CN | 111558393 | A | 8/2020 |
| CN | 113289677 | A | 8/2021 |
| EP | 1228166 | A1 | 8/2002 |
| EP | 2123736 | A1 | 11/2009 |
| EP | 3040324 | A1 | 7/2016 |
| WO | 01/29152 | A1 | 4/2001 |
| WO | 2007/135053 | A1 | 11/2007 |
| WO | 2010/099885 | A1 | 9/2010 |
| WO | 2010097175 | A1 | 9/2010 |
| WO | 2011071755 | A2 | 6/2011 |
| WO | 2011/138520 | A2 | 11/2011 |
| WO | 2013/175204 | A1 | 11/2013 |
| WO | 2014/008337 | A1 | 1/2014 |
| WO | 2018045652 | A1 | 3/2018 |
| WO | 2018/071905 | A1 | 4/2018 |
| WO | 2018106396 | A1 | 6/2018 |
| WO | 2018106397 | A1 | 6/2018 |
| WO | 2019/020513 | A1 | 1/2019 |
| WO | 2019/158687 | A1 | 8/2019 |
| WO | 2019/228797 | A1 | 12/2019 |
| WO | 2020060591 | A1 | 3/2020 |
| WO | 2022063992 | A1 | 3/2022 |

OTHER PUBLICATIONS

Danish Search Report mailed on Jun. 28, 2022, by the European Patent Office for European Application No. 22152691.6, 6 Pages.
Written Opinion mailed on Feb. 2, 2023, by the European Patent Office for International Application No. PCT/EP2022/087475, 8 Pages.
Baerlocher, et al., "Atlas of Zeolite Framework Types", Structure Commission of the International Zeolite Association by Elsevier, Sixth Revised Edition, 2007, 405 pages.
CN104059682A Description Translation (2014).
European Search Report dated Feb. 24, 2021, issued by the European Patent Office in corresponding European Application No. 0198386.3-1101. (8 pages).
International Preliminary Report on Patentability received for PCT Patent Application No. PCT/EP2021/076369, mailed on Apr. 6, 2023, 10 pages.
International Preliminary Report on Patentability received for PCT Patent Application No. PCT/EP2021/076372, mailed on Apr. 6, 2023, 14 pages.
International Preliminary Report on Patentability received for PCT Patent Application No. PCT/EP2021/076373, mailed on Apr. 6, 2023, 10 pages.
International Search Report and Written Opinion received for PCT Patent Application No. PCT/EP2021/076369, mailed on Dec. 10, 2021, 13 pages.
International Search Report and Written Opinion received for PCT Patent Application No. PCT/EP2021/076373, mailed on Dec. 10, 2021, 13 pages.
International Search Report and Written Opinion received for PCT Patent Application No. PCT/EP21/076372, mailed on Dec. 10, 2021, 18 pages.
Search Report mailed on Mar. 25, 2021, by the Danish Patent Office for Application No. PA 2020 01110, 9 pages.
Search Report mailed on Mar. 26, 2021, by the Danish Patent Office for Application No. PA 2020 01109. (9 pages).
Teketel et al., "Co-conversion of methanol and light alkenes over acidic zeolite catalyst H-ZSM-22: Simulated recycle of non-gasoline range products", Applied Catalysis A: General, 2015, pp. 68-76, vol. 494, No. 31.
Yarulina et al., "Suppression of the Aromatic Cycle in Methanol-to-Olefins Reaction over ZSM-5 by Post-Synthetic Modification Using Calcium", ChemCATChem, 2016, pp. 3057-3063, vol. 8, Issue 19.
U.S. Appl. No. 18/245,828, filed Mar. 17, 2023, Pablo Beato.
U.S. Appl. No. 18/245,808, filed Mar. 17, 2023, Pablo Beato.
U.S. Appl. No. 18/027,017, filed Mar. 17, 2023, Pablo Beato.
U.S. Appl. No. 18/849,228, filed Sep. 20, 2024, Finn Joensen.

PROCESS AND PLANT FOR CONVERSION OF OXYGENATES

This application is a 371 of PCT/EP2022/087475 filed Dec. 22, 2022.

FIELD OF THE INVENTION

The present invention relates to the production of synthetic fuels and chemicals. More specifically, the invention relates to a process for co-producing a C3 olefin product stream, in particular chemical grade propene (propylene) containing at least 93 vol % propylene, and hydrocarbons boiling in the jet fuel range, thus usable as jet fuel, particularly as sustainable aviation fuel (SAF). Embodiments of the invention include the production of the C3 olefin product stream, an olefin product stream from the conversion of oxygenates such as methanol and/or dimethyl ether, and further the conversion of the olefin product stream by oligomerization and hydrogenation into the jet fuel, particularly SAF.

BACKGROUND OF THE INVENTION

Currently, processes for the conversion of oxygenates such as methanol to olefins (MTO) are used to produce ethylene and propylene as the main olefin products with the purpose of serving as feedstock for plastic production. When higher hydrocarbons are the desired products such as in e.g. methanol to gasoline (MTG) processes, around 30% of aromatics are typically formed. However, when producing hydrocarbons boiling in the jet fuel range, particularly sustainable aviation fuels (SAF), current requirements do not allow the presence of aromatics in the olefin stream feed, yet it may contain aromatics from other sources.

Due to society concerns about global climate change and the resulting political pressure on the aviation industries, the market for SAFs is expected to increase substantially during the next decades. Currently, a small number of biocatalytic and thermo-catalytic processes have been approved by ASTM to be able to produce SAFs. Hence, a pre-condition for the use of any SAF as aviation turbine fuel is an ASTM certification. So far, only a small number of processes, producing SAF or synthetic paraffinic kerosene (SPK) fuels have been approved by ASTM International (ASTM) Method D7566 for blending into jet fuel at levels up to 50%. One important general requirement is therefore, that the synthetic part of SAF (50 vol %) must be virtually free from aromatics, while the final SAF blend can contain up to 26.5 vol % aromatics.

Furthermore, in the chemical industry, the normal practice is to produce propene (propylene) and jet fuel in separate processes. While the MTO reaction may be used to produce propylene along with other hydrocarbons, purification of the propylene to an acceptable grade is normally perceived as being costly and energy intensive. Synthetic jet fuel, in particular SAF, is not produced industrially yet and one reason may be related to the difficulties in obtaining sufficient economy in such process.

U.S. Pat. No. 4,476,338 discloses a process for converting methanol and/or dimethyl ether to olefins comprising a major fraction of light olefins, at moderate temperature and atmospheric pressure comprising contacting the feed with a crystalline zeolite catalyst designated as ZSM-48. This citation teaches (Ex. 1-2, Table 2) the use of ZSM-48 with a silica-to-alumina ratio (SAR) higher than 110, more specifically 113 or 180, and where methanol is converted over the zeolite catalyst at atmospheric pressure and a moderate temperature of 370 °C There is a significant production of aromatics, in the range 10-12 wt %, and low production of propylene, about 13 wt % (Example 1).

WO 2018106396 A1 discloses a process and plant for integration of an oxygenate conversion process with an olefin oligomerization process. The integrated process can produce gasoline of a desired octane and/or distillate fuel of a desired cetane. A gaseous effluent from a separation stage in between the oxygenate conversion and oligomerization is used as the recycle to the MTO as well as gaseous feed to the oligomerization.

WO 2011071755 A2 discloses a process for converting methanol to light olefins, gasoline and distillate. The light olefins from methanol conversion—an intermediate composition having at least two carbon atoms—is sent to an oligomerization step to yield gasoline boiling range components and distillate boiling range components. The gasoline components are then separated, and a portion thereof recycled to the feed to the methanol conversion, for thereby controlling the adiabatic temperature increase in this conversion step and convert C5+olefins in the recycle stream to C5+branched paraffins and C7+aromatics.

EP 1228166 A1 discloses a process for selectively converting a feed comprising oxygenate to C4 to C12 olefins in a single step which comprises contacting said feed under oxygenate conversion conditions with a catalyst comprising a unidimensional 10-ring zeolite, and recovering a normally liquid boiling range C5+ hydrocarbons-rich product stream, e.g., gasoline and distillate boiling range hydrocarbons or C4 to C12 olefins.

Applicant's US 2019/0176136 discloses the use of a ZSM-23 zeolite as catalyst for methanol to olefin conversion in a process step which is conducted at atmospheric pressure (about 1 bar) and 400 °C, thereby producing a hydrocarbon stream with less than 5 wt % aromatics. The catalyst lifetime is increased by providing the catalyst with particular dimensions in the direction of the channel system.

Applicant's co-pending patent application PCT/EP2021/076369 describes the conversion of a feedstock comprising oxygenates such as methanol and/or dimethyl ether to an olefin stream essentially free of aromatics and ethylene (C2=), yet with a high content of higher olefins C3=-C8=, especially (C4=-C8=) and optionally a significant amount of isoparaffins.

The invention relates also to the subsequent conversion of the olefin stream to the hydrocarbons boiling in the jet fuel range, particularly sustainable aviation fuel (SAF), by oligomerization and hydrogenation.

U.S. Pat. No. 4,482,772 relates to a process for converting methanol into gasoline and distillate range hydrocarbons. In a first stage, methanol is converted to lower olefins. In a second stage, the produced olefins together with aromatics are passed to an oligomerization reactor and the distillate range hydrocarbons are then recovered. More specifically, this citation relates to the so-called MOGD process (Mobil Olefins to Gasoline/Distillate process) whereby C2=(ethylene) is separated from the first stage, not C3=(propylene). Further, this citation is at least silent on avoiding feeding C3= to the oligomerization reactor.

SUMMARY OF THE INVENTION

As used herein, “MTO” (methanol to olefins) means the conversion of an oxygenate such as methanol to olefins.

As used herein, “OLI” means oligomerization.

As used herein, “HYDRO” means hydrogenation.

As used herein, "HYDRO/OLI" means a single combined step comprising hydrogenation and oligomerization. The term is used interchangeably with "OLI/HYDRO". It would be understood, that OLI represents normally the first step and HYDRO the second step.

As used herein, "MTJP" means methanol to jet fuel and propylene, and is interchangeable with the term "overall process" or "overall process and plant", which means a process/plant combining MTO, OLI and HYDRO, whereby a feedstock comprising oxygenates such as methanol is converted into propylene and jet fuel. The overall process and plant may also include a front-end section for producing the oxygenate(s).

As used herein, the terms "jet fuel" and "hydrocarbons boiling in the jet fuel range" are used interchangeably and have the meaning of a mixture of C8-C16 hydrocarbons boiling in the range of about 130-300 °C at atmospheric pressure.

As used herein, "SAF" means sustainable aviation fuel or aviation turbine fuel, in compliance with ASTM D7566 and ASTM D4054.

As used herein, the terms "methanol" and "dimethyl ether" are used interchangeably with the terms MeOH and DME, respectively. "MeOH/DME" means MeOH and/or DME.

As used herein, the term "first olefin stream" means a stream exiting MTO and also means a hydrocarbon stream rich in olefins comprising higher and lower olefins, and optionally also aromatics, paraffins, iso-paraffins and naphthenes, and in which the combined content of higher and lower olefins is at least 25 wt %, such as 30 wt % or 50 wt %. For example, the first olefin stream comprises C2 olefins (C2=) and C3-C8 olefins (C3=-C8=).

As used herein the term "olefin product stream" means a hydrocarbon stream rich in olefins comprising higher and lower olefins, and optionally also aromatics, paraffins, iso-paraffins and naphthenes. The olefin product stream is an olefin stream from which C3 olefins (C3=) have been removed. The olefin product stream contains substantially less C3= than a first olefin stream produced in the MTO, such that the concentration of C3= in the olefin product stream is less than half (50 wt %) of the concentration of C3= in the first olefin product stream, such as less than 20 wt %.

As used herein, the term "higher olefins" means olefins having three (3) or more carbons (C3+ olefins), in particular C3-C8 olefins (C3=-C8=), including olefins having four (4) or more carbons (C4+ olefins), in particular C4-C8 olefins (C4=-C8=).

As used herein, the term "lower olefins" means an olefin having two carbons, i.e. ethylene (C2-olefin or synonymously C2= or ethene).

As used herein, the terms C3 olefin, C3=, propene, propylene, are used interchangeably. As used herein, the term "C3 olefin product stream" means a stream rich in propylene, suitably at least 93 vol % propylene corresponding to chemical grade propylene, or for instance at least 99.5 vol % corresponding to polymer grade propylene.

As used herein, the term "high content of higher olefins" means that the weight ratio in the first olefin stream or the olefin product stream of higher olefins to lower olefins is above 1, suitably above 10, for instance 20-90 such as 70-80.

As used herein, the term "selectivity to higher olefins" means the weight ratio of higher to lower olefins i.e. weight ratio of higher olefins to ethylene. "High selectivity to higher olefins" or "higher selectivity to higher olefins" means a weight ratio of higher to ethylene of above 10.

As used herein, the terms "C2-light fraction" means C2= and C1-2 hydrocarbons. As used herein, the term "lower hydrocarbons" means C1-2 (e.g. methane, ethane) and optionally also C2=. The term is also used interchangeably with the term "light paraffins".

As used herein, the term "essentially free or ethylene" or "free of ethylene" or "free of propylene" means 1 wt % or lower.

As used herein, the term "essentially free of aromatics", "substantially free of aromatics", "aromatic-free" or "low aromatics" means less than 5 wt %, e.g. 1 wt % or even less than 1 wt %. Aromatics include benzene (B), toluene (T), xylene (X) and ethylbenzene. It would be understood that the "xylene" is any one of three isomers of dimethylbenzene, or a combination thereof.

As used herein, the term "partial conversion of the oxygenates" or "partly converting the oxygenates" means a conversion of the oxygenates of 20-80%, for instance 40-80%, or 50-70%.

As used herein, the term "full conversion of the oxygenates" or "fully converting the oxygenates" means above 80% conversion of the oxygenates, for instance 90% or 100%.

As used herein, the term "substantial methanol conversion" is used interchangeably with the term "full conversion of the oxygenates", where the oxygenate is e.g. methanol.

As used herein, the terms "catalyst comprising a zeolite" and "zeolite catalyst" are used interchangeably.

As used herein, the term "silica to alumina ratio (SAR)" means the mole ratio of $SiO_2$ to $Al_2O_3$.

As used herein, the term "significant amount of paraffins" means 5-20 wt %, such as 10-15 wt % in the first olefin stream.

Other definitions are provided in connection with one or more embodiments of the invention.

It is an object of the present invention to provide a simple process for the conversion of oxygenates into the valuable products propylene and sustainable aviation fuel (SAF); more specifically, to be able in a simple manner to produce from an oxygenate such as methanol and/or DME not only a valuable fuel such as SAF, but also a valuable chemical, particularly propylene, more specifically chemical grade or polymer-grade propylene.

It is another object of the present invention to provide a process which allows flexibility in the tuning of how much propylene is produced with respect to jet fuel, more particularly SAF.

These and other objects are solved by the present invention.

Accordingly, the present invention is a process for producing a C3 olefin product stream and a hydrocarbon stream comprising hydrocarbons boiling in the jet fuel range, said process comprising:

i) passing a feedstock stream comprising oxygenates over a catalyst active in the conversion of oxygenates at a pressure of 1-100 bar and temperature of 240-400 °C; thereby producing a first olefin stream;

ii) conducting the first olefin stream to a first separation step and withdrawing thereof a liquid hydrocarbon fraction comprising at least 50 wt % of the C3-olefins contained in said first olefin stream;

iii) conducting the liquid hydrocarbon fraction to a fractionation step and separating therefrom said C3 olefin product stream and an olefin product stream;

iv) passing at least a portion of the olefin product stream, i.e. after separating said C3-olefin product stream, through an oligomerization step over an oligomerization catalyst, and optionally subsequently conducting a separation step, for thereby producing an oligomerized stream;

v) passing at least a portion of the oligomerized stream through a hydrogenation step over a hydrogenation catalyst, and optionally subsequently conducting a separation step, for thereby producing said hydrocarbon stream comprising hydrocarbons boiling in the jet fuel range.

Accordingly, in an embodiment, step iv) further comprises subsequently conducting a separation step for thereby producing said oligomerized stream; and/or step v) further comprises subsequently conducting a separation step, for thereby producing said hydrocarbon stream comprising hydrocarbons boiling in the jet fuel range.

Suitably, the first olefin stream comprises C3 olefins (C3=) and C3-C8 olefins (C3=-C8=), such as C4-C8 olefins.

Suitably, in step ii) the liquid hydrocarbon fraction comprises at least 75 wt %, such as at least 90 wt %, or at least 95 wt % of the C3-olefins contained in said first olefin stream. Accordingly, at least 75%, such as at least 90% of the propylene is retained in the liquid hydrocarbon fraction at this point.

The term “suitably” means “optionally”, i.e. an optional embodiment.

The term “present invention” or simply “invention” may be used interchangeably with the term “present application” or simply “application”.

The prior art, in particular said U.S. Pat. No. 4,482,772, is silent on the separation of propylene in two steps ii), iii), and which provides the following associated benefits:

The invention enables obtaining a high purity C3 olefin stream, suitably at least 90 vol % pure: containing at least 90 vol % propylene, for instance at least 93 vol % propylene corresponding to chemical grade propylene, or for instance at least 99.5 vol % corresponding to polymer grade propylene. Thereby, the present invention enables by simple means the production of a chemical grade or polymer grade C3 olefin product stream as well as an olefin product stream which is highly suitable for downstream oligomerization into SAF. Hence, by the invention it is now also possible to produce SAF or jet fuel components by further oligomerization and hydrogenation, as recited farther below, together with the high purity propylene; i.e. the production of chemical grade propylene and SAF are integrated in a single process and plant.

The process of the invention allows for easy separation of high purity propylene which can be used for chemicals and/or polymers, as it has been found that the first olefin stream from the conversion of oxygenates (step i) not only is essentially free of ethylene, but may also be essentially free of propane, which enables simple separation of the propene (propylene) from the olefin stream. Thereby, polymer grade propylene is provided by simple separating it from the olefin stream e.g. via simple gas separation such as flash distillation. Propylene is of high commercial importance as a raw material building block and normally, such chemical grade propylene is produced separately, e.g. in a refinery plant, by steam cracking of a hydrocarbon feed such as naphtha, whereby a mixture of propylene and propane is generated, thus requiring a more complicated and expensive separation. For instance, steam cracking requires addition of steam and heating to reaction temperatures of about 850 °C, whereby a number of light olefins are formed incl. propylene.

Surprisingly also, it has been found, that an oligomerization feed low in propylene is beneficial for the OLI reaction: the effect of removing propylene from the feed to the oligomerization step (i.e. the olefin product stream) improves the yield in this OLI-step of the desired branched C8-C16 fraction for jet fuel. Without being bound by any theory, propylene appears reactive for oligomerization, yet not selective, as it competes with or removes the active centres of the higher olefins in the olefin product stream that is fed to the downstream oligomerization and which active centres are highly selective for oligomerization.

In an embodiment, in step i) the pressure is in the range 1-30 bar, such as 1-25 bar or 2-25 bar, and the temperature is in the range 240-360 °C, such as 300-360 °C. At these conditions, the content of aromatics in the first olefin stream is further reduced, while at the same time the weight ratio of higher olefins (C3-C8 olefins) to lower olefins (ethylene) is increased. A higher proportion of C3-C8 olefins is desirable for being able to withdraw a significant amount as the C3-olefin product as well as for further downstream oligomerization of in particular the C4-C8 olefins into jet fuel. Furthermore, the lower the temperature, the lower the propane content in the first olefin stream, which is desirable for easier separation of the propylene being produced.

In an embodiment, the catalyst in step i) (MTO step) comprises a zeolite with a framework having a 10-ring pore structure, in which said 10-ring pore structure comprises: (a) a unidimensional (1-D) pore structure, and/or a two-dimensional (2-D) pore structure, and/or (b) a three-dimensional (3-D) pore structure.

It would be understood, that the term “comprises” or “comprising”, may also mean “comprises only” i.e. consists of, or “comprising only”, i.e. consisting of.

A zeolite with a framework having a 10-ring pore structure means a pore circumference defined by 10 oxygens.

A 1-D pore structure means zeolites containing non-intersecting pores that are substantially parallel to one of the axes of the crystal. The pores preferably extend through the zeolite crystal. A 2-D pore structure means zeolites containing intersecting pores that are substantially parallel to two axes of the crystal. A 3-D pore structure means zeolites containing intersecting pores that are substantially parallel to all three axes of the crystal. The pores preferably extend through the zeolite crystal.

In an embodiment, said unidimensional (1-D) pore structure is selected from any of *MRE (ZSM-48), MTT (ZSM-23), TON (ZSM-22), or combinations thereof; suitably, the pressure is said 1-25 bar, such as 2-25 bar, and the temperature is 240-360 °C such as 300-360 °C It would be understood that the term “*MRE (ZSM-48)” refers to a zeolite type material and means that the term “*MRE” and “ZSM-48” may be used interchangeably. The same applies for the terms MTT (ZSM-23), TON (ZSM-22).

The obtained first olefin product stream exiting the oxygenate conversion (MTO step i) is thereby essentially free of aromatics, ethylene (C2=) and propane, yet with significant content of propylene e.g. 10-40 wt % or 10-35 wt %, for instance about 15 wt %, 20 wt % or 30 wt %, and even higher content of higher olefins (C4=-C8=) e.g. 40-60 wt % such as about 50 wt % and optionally a significant content of isoparaffins e.g. 10-15 wt %. For instance, with the MTO (step i) operating with a 1-D zeolite such as ZSM-48 at 2 bar, see Example 1, the content of propylene (C3=) in the first olefin stream may be about 15-25 wt % at 320 °C and about 30-40 wt % at 360 °C. At the same time, the content in the first olefin stream of desirable C4-C8 oleifns is kept at about 40-60 wt % or higher, and the content of in some instances, less desirable aromatics, below 1 wt %.

The three letter code, e.g. *MRE, for structure types are assigned and maintained by the International Zeolite Association Structure Commission in the Atlas of Zeolite Framework Types, which is at http://www.iza-structure.org/databases/ or for instance also as defined in "Atlas of Zeolite Framework Types", by Ch. Baerlocher, L. B. McCusker and D. H. Olson, Sixth Revised Edition 2007.

It would be understood that the term "ZSM-48" may be used interchangeably with the term "EU-2".

It would be understood that the term "temperature" means the MTO reaction temperature in an isothermal process, or the inlet temperature to the MTO in an adiabatic process. The same applies for the temperature in the OLI and/or HYDRO step.

In an embodiment, the catalyst in step i) comprises a zeolite with a framework having a 10-ring pore structure, in which said 10-ring pore structure comprises: (b) a two-dimensional (2-D) pore structure such as FER, e.g. ZSM-35; suitably, the pressure is 1-25 bar, such as 2-25 bar, and the temperature is 240-360 °C such as 300-360 °C.

In an embodiment, the catalyst in step i) comprises a zeolite with a framework having a 10-ring pore structure, in which said 10-ring pore structure comprises: (c) a three-dimensional (3-D) pore structure such as MFI, for instance MFI modified with an alkaline earth metal, e.g. a Ca/Mg-modified ZSM-5, in particular a Ca-modified ZSM-5; suitably, the pressure is 1-25 bar, such as 2-25 bar, and the temperature is 240-360 °C such as 300-360 °C. In another embodiment, the 3-D pore structure is SZR such as SUZ-4, or AEI such as SAPO-18.

The obtained first olefin stream is thereby richer in aromatics, e.g. up to 5 or 10 wt % yet within an acceptable level for further oligomerization, while the proportion of higher olefins to lower olefins decreases, for instance the ratio of higher olefins to lower olefins being about 2 or 1. The lower the temperature, the lower the content of aromatics and lower olefins, thus the higher the ratio of higher to lower olefins.

In an embodiment, the catalyst in step i), i.e. the MTO catalyst, comprises a binder. The catalyst is suitably formed by combining the zeolite with the binder, and then forming the catalyst into pellets. The pellets may optionally be treated with a phosphoric reagent to create a zeolite having a phosphorous component between 0.5 and 15 wt % of the treated catalyst i.e. 0.5-15 wt % phosphorous in the catalyst. The phosphorous provides stability to the catalyst. The binder is used to confer hardness and strength on the catalyst. Binders include alumina, aluminum phosphate, silica, silica-alumina, zirconia, titania and combinations of these metal oxides, and other refractory oxides, and clays such as montmorillonite, kaolin, palygorskite, smectite and attapulgite. A preferred binder is an aluminum-based binder, such as alumina, aluminum phosphate, silica-alumina and clays.

In an embodiment, the catalyst in step i) contains up to 30-90 wt % zeolite with the binder, suitably 50-80 wt %, the binder suitably comprising an alumina component such as a silica-alumina. For instance, the process comprises mixing e.g. impregnating the catalyst with the binder, such that the catalyst contains up to said 50-80 wt % zeolite with the binder, the binder suitably comprising an alumina component such as a silica-alumina, thus forming a silica-alumina binder. As an example, the catalyst is 60 wt % zeolite and 40 wt % alumina.

It would be understood that the wt % of zeolite in the binder means the wt % of the zeolite with respect to the catalyst weight, in which the catalyst comprises the zeolite and the binder.

It would also be understood, that for the purposes of the present application, the term "binder" is also referred to as "matrix binder" or "matrix/binder" or "binder/matrix".

The binder confers hardness and strength of the catalyst in the MTO step. However, it has now been found that the use of a binder in the catalyst comprising an alumina component, also conveys the undesired effect of MeOH/DME-cracking in the MTO when operating at temperatures above 360 °C, thereby producing methane as an undesired by-product. The methane needs to be disposed of, e.g. by burning or flaring, which increases the carbon footprint of the process and plant. Further, the yield of the desired olefin stream (first olefin stream) comprising i.a. higher olefins is reduced, as some of the feed is converted to the undesired methane by-product instead. It would be understood, that in the MTO reaction, methanol may be initially converted to DME by methanol dehydration.

Hence, it turns out that the binder of the catalyst at the low MTO temperatures of an embodiment of the present invention, particularly where the catalyst comprises a zeolite with a framework having a 10-ring pore structure, in which said 10-ring pore structure comprises: (a) a unidimensional (1-D) pore structure, said unidimensional (1-D) pore structure is selected from any of *MRE (ZSM-48), MTT (ZSM-23), TON (ZSM-22), or combinations thereof; the pressure is 1-25 bar, such as 2-25 bar, and the temperature is 240-360 °C such as 300-360 °C, does not promote MeOH/DME cracking so the undesired methane is not produced, thereby enabling an increase in yield of the desired olefin stream as explained above. Without being bound by any theory, it is believed that by the present invention, the DME quickly reacts to olefins before cracking into methane.

The invention provides thereby the benefits associated to having a binder, incl. better stability of the catalyst, while at the same time eliminating its disadvantages, namely the promotion of MeOH/DME cracking into undesired methane.

In an embodiment, the zeolite in the MTO step i) has a silica-to-alumina ratio (SAR) of up to 240. In a particular embodiment, the zeolite has a SAR of up to 110, such as up to 100. In another particular embodiment, the zeolite has a SAR is higher than 10, for instance 15 or 20, or 30, 40, 50, 60, 70, 80, 90, 100. In yet another particular embodiment, the zeolite is ZSM-48 having SAR up to 110, e.g. up to 100.

The catalysts in step i) may be prepared by standard methods in the art, for instance as disclosed in U.S. Pat. No. 4,476,338 for ZSM-48. Suitably, there is mixing of the final catalyst with a binder/matrix, such as in a catalyst that contains up to 50-80 wt % zeolite in a matrix/binder comprising an alumina component such as a silica-alumina matrix binder.

For instance also, a Ca/Mg-modified ZSM-5 i.e. a ZSM-5 modified with Ca and/or Mg, may be prepared by standard methods in the art. For instance, Ca and/or Mg are loaded in a commercially available ZSM-5 zeolite at concentrations of 1-10 wt. %, such as 2, 4 or 6 wt. %, by ion-exchange e.g. solid-state ion-exchange; or wet impregnation e.g. incipient wetness impregnation or any other suitable impregnation. For instance, impregnation of the final catalyst with binder/matrix, such as in a catalyst that contains up to 50-80 wt % zeolite in a matrix/binder comprising an alumina component such as a silica-alumina matrix binder.

In an embodiment, the pressure in step i) is 2-25 bar, such as 2, 5, 10 or 12 or 17 or 20 or 22 bar. It has been found that while higher pressures—e.g. above 25 bar—increase the ratio of higher olefins to lower olefins i.e. higher selectivity to higher olefins, the higher pressures may also decrease the total yield of olefins, i.e. lower conversion of the oxygenate feed to olefins and also increase the required temperature to achieve full conversion, and which in turn may create the risk of less desired cracking reactions taking place. At the pressure range recited above, for instance 2-10 bar, 5-10 bar, 1-15 bar, or 20-25 bar, it is now possible to obtain a higher selectivity to higher olefins without requiring increasing the temperatures to high levels for achieving full conversion, thereby also reducing the occurrence of cracking reactions. Further, the formation of ethylene is suppressed and so is the formation of aromatics. The first olefin stream, therefore, contains the higher olefins C3-C8 as well as isoparaffins. In particular, conducting the process at higher pressures than atmospheric has the associated benefit of enabling an amount of diluent as "heat sink" for the exothermal reaction.

It would be understood that the lower the methanol concentration in the feedstock, the higher the pressure which is required to maintain high methanol conversion, since the partial pressure of methanol ($P_{MeOH}$), is the actual relevant parameter to track during operation of the process. For instance, where the concentration of methanol in the feedstock is 10 vol. %, and the MTO is operated at a $P_{MeOH}$ of 0.3 or 0.5 bar, this corresponds to the pressure in the MTO being 3 or 5 bar, respectively. If the concentration of methanol in the feedstock is 5 vol. %, and the MTO is operated at a $P_{MeOH}$ of 0.3 or 0.5 bar, this corresponds to higher pressures, the pressures in the MTO now being 6 or 10 bar.

A pressure at the higher end of the range, e.g. 15 bar, 20 bar or 25 bar, enables better match—and thereby significant compression energy savings—with the pressure of a subsequent oligomerization or OLI/HYDRO, as also explained farther below. The invention provides, therefore, also a process whereby it is now possible to closely match the pressure of the MTO with the pressure of the subsequent oligomerization or OLI/HYDRO, while still maintaining high conversion and an olefin product stream which is ideal for subsequent oligomerization and/or OLI/HYDRO.

At the low temperatures of the MTO according to the present invention, suitably 240-360 °C, with a zeolite having a 1-D pore structure such as ZSM-48, the partial pressures of the feed, e.g. methanol ($P_{MeOH}$), do not play a decisive role in terms of selectivity to aromatics. This is contrary to the common understanding that methanol partial pressures play a decisive role in the selectivity to aromatics and paraffins. This means, that compared with operation of the MTO at temperatures higher than e.g. 360 °C, where $P_{MeOH}$ has a high effect on the amount of aromatics produced, with higher $P_{MeOH}$ significantly generating higher content of aromatics, by the present invention where operation of the MTO is conducted at temperatures of suitably 360 °C or below, e.g. 320 °C, particularly with a catalyst having a unidimensional (1-D) pore structure selected from any of *MRE (ZSM-48), MTT (ZSM-23), TON (ZSM-22), or combinations thereof, changing the $P_{MeOH}$ does not show any significant influence, as the content of aromatics is maintained below 2 wt % or below 1 wt % and at similar values regardless of the $P_{MeOH}$. For instance, with MTO operating with ZSM-48 (EU-2), 440 °C, methanol concentration in the feed of 10% (volume basis), $P_{MeOH}$ of 0.3 and 0.5 the content of aromatics is about 3 wt % and 9 wt %, respectively; with MTO operating at 400 °C, at $P_{MeOH}$ of 0.3 and 0.5 the content of aromatics is about 2 wt % and 6 wt %, respectively. Now, when operating the MTO at 360 °C, at $P_{MeOH}$ of 0.3 and 0.5 the content of aromatics is about 1 wt % and 2 wt %, respectively; and when operating the MTO at 320 °C, at $P_{MeOH}$ of 0.3 and 0.5 the content of aromatics is about 1 wt % at both $P_{MeOH}$. Thus, the higher the $P_{MeOH}$, the higher the content of aromatics, yet by reducing the temperature according to the present invention, suitably 360 °C or below, it is possible to increase the $P_{MeOH}$ to some degree and thereby the pressure (total pressure), without producing more aromatics.

Hence, by the present invention, the higher independence of the aromatic content with respect to $P_{MeOH}$ at the lower MTO temperatures, for instance at temperatures of particularly 360 °C or below, such as 350 °C or 340 °C or 320 °C or 300 °C, enables also operation at the higher end of the pressures, e.g. 15, 20 or 25 bar. Not only are these pressures better matched to the downstream operations, e.g. oligomerization or OLI/HYDRO, as mentioned above, but they are also closer to the pressures used in the upstream process, in particular methanol synthesis, which operates at high pressures, typically about 50-100 bar. Higher energy savings in terms of lower compression energy is thereby achieved, as is a reduction in equipment size.

Despite the relatively low temperatures used, i.e. reaction temperatures of 240-360 °C e.g. 260-360 °C, or 260-340 °C, the catalysts are also active in not only suppressing the formation of aromatics which in some instances are unwanted in the feed to OLI, but also in providing a high selectivity for the higher olefins C3=-C8=, no ethylene formation, significant isoparaffin formation, full conversion, while also showing an extended catalyst lifetime. For instance, it has been found that ZSM-48, when applied at said low temperatures, converts methanol to an olefin stream which is ideal for further oligomerization and hydrogenation to jet fuel, particularly SAF in accordance with ASTM as defined above. The fact that the olefin product is essentially free of ethylene and aromatics, the latter in some instances being less desirable, while the yield of C3-C8 olefins is between 70-80%, combined with 10-15% isoparaffins, makes the product an ideal feed for further oligomerization to SAF. Surprisingly also, a significant amount of C3 olefins is formed which is simple to separate and withdraw in the process as a valuable chemical product.

Compared to the prior art according to e.g. U.S. Pat. No. 4,476,338, where MTO is conducted over a ZSM-48 having SAR of 113 or 180 and at 370 °C (Example 1 and 2 therein), in the present invention, where MTO is conducted at temperatures of 360 °C or below with a ZSM-48 having e.g. a lower SAR, there is a higher production of total olefins (e.g. C2-C8 olefins); lower production of ethylene, for instance the content of ethylene now being less than 1 wt %; lower production of aromatics, for instance the content of aromatic compounds now being less than 1 wt %; and optionally higher production of isoparaffins, for instance now 10-15 wt %. Moreover, the content of propylene according to the present invention is significantly increased, the content of propylene now for instance being 35-40 wt % compared to e.g. about 13 wt % in Example 1 of U.S. Pat. No. 4,476,338.

Furthermore, the lifetime of the catalyst is increased, as explained below.

The combination of operating the oxygenate conversion with e.g. ZSM-48 with SAR up to 110 and lower temperature (e.g. 300-360 °C) conveys at least three highly beneficial effects:

a) the selectivity to ethylene and aromatics is decreased to below 1 wt % in either case;
b) a significant amount of isoparaffins may be formed, which can be used in the process. Isoparaffins, as well as the C3-C8 olefins, in particular C4-C8 olefins, may also be oligomerized, so that isoparaffins may be formed as a desired by-product. The isoparaffins may optionally be separated for alkylation to increase octane number and then be incorporated into a gasoline pool, or simply be used as part of the olefin stream for downstream oligomerization;

c) due to the lower applicable temperature, the overall lifetime (number of cycles) of the catalyst is increased as an effect of the lower dealumination rate (affected by the combination of high temperature and water vapor produced during reaction). Further, the lifetime during each cycle, i.e. cycle time, of the catalyst is substantially increased, which without being bound by any theory, is probably an effect of the lower selectivity to aromatics due to less hydrogen transfer reactions. High catalyst longevity in terms of both overall lifetime (number of cycles) and cycle time, is highly important for enabling its use in actual commercial applications;

d) once again, the selectivity towards production of propylene is increased, thereby enabling the production, in a simple manner, of highly pure propylene, which is a product normally having a significantly higher market price than jet fuel.

For the purposes of the present application, the terms "catalyst longevity" and "catalyst lifetime" are used interchangeably.

Moreover, if a binder is included in the catalyst, which is relevant for commercial applications, the present invention will also enable a higher yield of desired products, e.g. C3-C8 olefins, in particular C4-C8 olefins for downstream oligomerization, since no or limited MeOH/DME cracking to methane occurs.

Accordingly, the features of the invention cooperate synergistically to bring about a superior process which is commercially applicable for conversion of the oxygenates to olefins and thereby for the subsequent downstream steps, e.g. oligomerization for producing SAF, while at the same time integrating within the same process the production of highly valuable chemical grade propylene.

While a suitable oligomerization feed may normally have some aromatics, for instance 10-20 wt % aromatics, as well as higher olefins and ethylene, the ideal oligomerization feed is namely substantially free of aromatics and composed of higher olefins, particularly C4-C8 olefins, and preferably as little as possible C2-light fraction, more particularly, free of ethylene. The lower the temperature in the MTO, the higher the content of higher olefins and thereby also the ratio of higher olefins to ethylene, i.e. the selectivity to higher olefins. Also, the lower the temperature, the lower the content of ethylene so the olefin stream is essentially ethylene-free, while the content of isoparaffins increases. Further, by having removed the C3-olefins from the first olefin stream, the olefin product stream to downstream oligomerization becomes richer in C4-C8 olefins and thereby easier to oligomerize, e.g. by simple dimerization, to the relevant jet fuel range C8-C16.

The oligomerization feed complies with the above ASTM requirements stipulating the 50% SAF blending part to be almost aromatic-free, more specifically that the content of aromatics be limited to below 0.5 wt %. The olefin stream can be converted into such jet fuel via oligomerization and hydrogenation in a more efficient overall process due to i.a. less recycling in the oligomerization and higher oligomerization yields. In other words, the higher olefins and low selectivity to aromatics and ethylene simplifies separation steps and increase overall yields of the jet fuel.

By using the moderately high pressure of 2-25 bar, for instance 2, 10, 15 or 20 bar in the MTO, it is possible to further shift the selectivity towards higher olefins. It has namely been found, as recited above, that while higher pressures increase the ratio of higher olefins to lower olefins i.e. higher selectivity to higher olefins, the higher pressures may also decrease the total yield of olefins (i.e. lower conversion of the oxygenate feed to olefins) and also increase the required temperature to achieve full conversion, which in turn creates the risk of less desired cracking reactions taking place. At the pressure range of 1-25 bar, it is now possible to obtain a higher selectivity to higher olefins without requiring increasing the temperatures to e.g. above 360 °C for achieving full conversion, thereby also reducing the occurrence of cracking reactions. By conducting the process at pressure above 1 bar, e.g. 2 bar or higher, it is also possible to provide an amount of diluent "heat sink" for the exothermal reaction, as also explained farther above. The invention enables a high flexibility in the selection of pressures, for instance at the higher end of the pressure range, such as 20 or 25 bar, as also explained farther above.

At the same time, reducing the temperature in the MTO to for instance 300 °C or 320 °C or lower, despite this in principle implying a reduction in methanol conversion, in fact still maintains the oxygenate conversion at close to 100%, while at the same time maintaining, in particular for a catalyst having a zeolite with 1-D pore structure, the content of ethylene below 1 wt %, and the content of propylene at a significant high level, e.g. 25 wt % or higher, for subsequent separation as valuable product. Further, the content of aromatics is also maintained at below 1 wt %. In particular, having a low content of ethylene and high content of propylene is highly desirable.

Now, while having a low content of aromatics in the olefin product stream may be desirable, as earlier explained, it has now also been found, that the production of aromatics, such as 10 or 20 wt % aromatics in the first olefin stream, may also provide a suitably feed for oligomerization and production of jet fuel and thereby SAF. There will still be compliance with the above ASTM requirements stipulating the 50% SAF blending part to be almost aromatic-free, more specifically that the content of aromatics be limited to below 0.5 wt %, provided that the right hydrogenation catalyst is applied, more specifically, provided that a proper hydrogenation catalyst is applied in step v), as it will become apparent from one or more embodiments related to the hydrogenation step recited farther below. It is normally assumed that aromatics are less desirable, also because there may be an attendant production of paraffins, e.g. C2-C5 paraffins, which are difficult to upgrade to jet fuel.

In an embodiment, step i) is conducted isothermally.

In an embodiment, step i) is conducted adiabatically. The adiabatic temperature rise, defined as the difference between outlet and inlet temperature, is for instance 40-100 °C In an embodiment, the feedstock stream is combined with a diluent, the feedstock stream is methanol and/or dimethyl ether (DME) (i.e. the oxygenates in the feedstock stream is methanol and/or DME), and the feedstock is diluted to a methanol and/or DME concentration in the feedstock of 1-30 vol. %, such as 2-20 vol. %, preferably 5-10 vol. %.

Thereby, the exothermicity in the conversion to olefins in the MTO (step i) is reduced, which is particularly relevant when the catalyst is arranged as a fixed bed.

In a particular embodiment, the diluent is a recycle stream resulting from the process, in which the process further comprises in the separation step (step ii):

withdrawing a gaseous fraction comprising C2-C3 olefins (C2=-C3=), suitably also comprising methane, ethane, propane, carbon monoxide, carbon dioxide and hydrogen, as said recycle stream.

The recycle stream is suitably between 1 to 20 times of the volumetric amount of the feedstock stream e.g. methanol feed stream. For instance, the feedstock stream (e.g. methanol) being diluted to a methanol concentration of 10 vol. % corresponds to a vol. ratio of the recycled stream to the feedstock stream of 1:9.

In a particular embodiment, the recycle stream contains 0.5-10% or 1-10% mol (vol. %) propylene and the concentration of methanol in the feedstock is 5-10 vol. %.

The feedstock stream may also be combined with an inert diluent, such as nitrogen or carbon dioxide or a light paraffin such as methane, thereby reducing the exothermicity in the conversion to olefins, which again is particularly preferred when the catalyst is arranged as a fixed bed. For instance, where the feedstock stream is methanol, it is diluted with e.g. nitrogen so that the methanol concentration in the feedstock is 1-30 vol. %, such as 2-20 vol. %, preferably 5-10 vol. %.

Suitably, the diluent is a combination of said recycle stream and said inert diluent.

The gaseous fraction withdrawn from step ii) is recycled to a point upstream the MTO reactor (in step i), thus diluting the oxygenate feedstock, e.g. methanol and/or dimethyl ether feed to the MTO reactor to reduce the temperature increase over this reactor.

The provision of the recycle stream gives other advantages. By mixing the oxygenate feed, e.g. the methanol and/or dimethyl ether feed, to the MTO reactor with minor amounts of propylene in the recycle stream, the stability, i.e. the life time, of the MTO catalyst is significantly increased. Introducing propylene to the feed to the MTO reactor allows decreasing the inlet temperature in the MTO reactor by promoting the kick-off or initiation of the oxygenate (e.g. methanol) conversion, which results in an increased yield of higher olefins and further increases the catalyst life time. Thereby also, increased flexibility in the selection of catalyst for MTO is possible; for instance, by the MTO operating at lower temperatures, for instance 300 °C or lower, such as 280 °C or 260 °C or 240 °C, zeolite having a 3-D pore structure such as ZSM-5 e.g. Ca-ZSM-5, may be utilized in the MTO without incurring the penalty of lowering conversion or producing a first olefin stream with a significant content of aromatics, where e.g. having aromatics is less desirable, while at the same time increasing the content of higher to lower olefins, compared to when operating at higher temperatures such as 320 °C or 340 °C. As recited earlier in connection with this zeolite type, the lower the temperature, the lower the content of aromatics and lower olefins, thus the higher the ratio of higher to lower olefins. Lower temperatures in the MTO, e.g. 320 °C, enable operation at the higher pressure range in the MTO, e.g. 15 or 20 bar or higher, which may be also advantageous by i.a. enabling a higher throughput in the MTO and reduction of equipment size in the plant for producing SAF.

In an embodiment, the separation step (step ii) further comprises withdrawing a water stream and the separation is conducted in a separation unit at 20-80 °C, e.g. about 25 °C, and 5-50 bar, such as 10-30 bar, e.g. 15 bar.

The separation unit is suitably conducted in a 3-phase separator.

The first olefin stream from the MTO reactor is therefore cooled in the separation unit, e.g. down to 25 °C, while adjusting the pressure to the range 5-50 bar, such as 10-30 bar, e.g. 15 bar. This causes the first olefin product stream to separate into: said gaseous fraction containing some propylene and which may also contain propane, ethene, ethane, methane, carbon monoxide, carbon dioxide and hydrogen, said liquid hydrocarbon fraction and liquid water (aqueous phase). For instance, the gaseous fraction has a low concentration such as less than 3 vol % or such as less than 1.5 vol % or such as less than 0.5 vol % or such as less than 0.25 vol % of ethene (ethylene) and a low concentration such as less than 1.5 vol % or such as less than 1 vol % or such as less than 0.5 vol % or such as less than 0.25 vol % of propane. The temperature and pressure in the separation unit is thus adjusted in such a way that at least 50%, preferably at least 75%, more preferably at least 90% of the propylene is retained in the liquid hydrocarbon fraction at this point.

The liquid water (aqueous phase) is removed from the first olefin stream produced in the MTO, since its presence may be undesirable when conducting the downstream oligomerization.

The boiling point of propylene at normal pressure is about −47 °C, which is impractically low for distillation. However, at for instance 10 bar and 15 bar, the boiling point of propylene is 20 °C and 34 °C, respectively. The next higher boiling component of the MTO products, apart from propane which is present in an acceptable low concentration for at least chemical grade propylene, is isobutene. This compound has a boiling point of e.g. 84 °C at 15 bar, which thus allows for an easy separation of a propylene-rich gaseous phase and a liquid phase rich in higher olefins, particularly C4-C8 olefins, suitable for further conversion to jet fuel.

Accordingly, in an embodiment, the fractionation step (step iii) is conducted in a distillation unit. Suitably, the fractionation step (step iii) is a flash step being conducted in a flashing unit, such as a flash distillation unit, at 20-80 °C, and 5-50 bar, such as 10-30 bar.

The aqueous phase is withdrawn from the separation unit leaving a condensed hydrocarbon mixture i.e. said liquid hydrocarbon fraction. This mixture is transferred to e.g. a distillation unit, such as a flash distillation unit, and heated to e.g. 34 °C at a pressure of e.g. 15 bar, whereby propylene distills off and is collected. The resulting C3 olefin product is then of high purity, e.g. at least 93 vol % propene (chemical grade) and may even be polymer grade propene (≥99.5 vol % propene), as already described.

In an embodiment, in step i) (in the MTO step) the weight hourly space velocity (WHSV) is 0.1-3 $h^{-1}$, such as 1-2 $h^{-1}$. At higher values of WHSV, the methanol conversion becomes too low.

In an embodiment, the feedstock stream comprising oxygenates is derived from one or more oxygenates taken from the group consisting of triglycerides, fatty acids, resin acids, ketones, aldehydes or alcohols or ethers. Said oxygenates may originate from one or more of a biological source, a gasification process, a pyrolysis process, Fischer-Tropsch synthesis, or methanol-based synthesis. In a particular embodiment, said one or more oxygenates are hydroprocessed oxygenates. By “hydroprocessed oxygenates” is meant oxygenates such as esters and fatty acids derived from i.e. resulting from hydroprocessing steps such as hydrotreating and hydrocracking.

In an embodiment, the oxygenates are selected from methanol (MeOH), dimethyl ether (DME), or combinations thereof. Suitably, said oxygenates comprise at least 90 vol % MeOH and/or DME.

It would thus be understood that e.g. MeOH is not necessarily a pure MeOH stream but may contain other oxygenates as well, said oxygenates comprising e.g. ethanol, propanol, acetone or a combination of these. The MeOH concentration is however, suitably at least 90% by weight.

Methanol and/or DME are particularly advantageous oxygenate feedstocks, as these are widely commercially available. Conversion of DME, releases half the amount of water (steam) compared to methanol, thereby reducing the rate of (irreversible) deactivation due to steam-dealumination of the zeolite catalyst. Moreover, carbon formation in the catalyst is slower with DME, thus enabling a higher number of cycles of the catalyst.

In an embodiment, the methanol is made from synthesis gas, i.e. methanol synthesis gas, prepared by using electricity from renewable sources such as wind or solar energy, e.g. eMethanol™. Hence, in an embodiment, the synthesis gas is suitably prepared by combining air separation, autothermal reforming or partial oxidation, and electrolysis of water, as disclosed in Applicant's WO 2019/020513 A1, or from a synthesis gas produced via electrically heated reforming as for instance disclosed in Applicant's WO 2019/228797. Thereby, an even more sustainable approach for the production of jet fuel, in particular SAF, is achieved. Methanol can be produced from many primary resources (including biomass and waste), in times of low wind and solar electricity costs, the production of E-methanol™ enables an even more sustainable front-end solution. Methanol and/or DME can also be produced from $CO_2$ and $H_2$, such as $H_2$ produced by electrolysis of water or steam.

In a particular embodiment, the process of the invention further comprises, prior to passing the feedstock stream comprising oxygenates over a catalyst active in the conversion of oxygenates, i.e. prior to step i), in which the feedstock comprising oxygenates is a methanol stream i.e. methanol feed stream:

producing said methanol feed stream by methanol synthesis of a methanol synthesis gas, wherein the methanol synthesis gas is generated by: steam reforming of a hydrocarbon feed such as natural gas, and/or at least partly by electrolysis of water and/or steam.

Hence, in another particular embodiment, the methanol feed stream is produced from methanol synthesis gas which is generated by combining the use of water electrolysis in an alkaline or PEM electrolysis unit, or steam in a solid oxide electrolysis cell (SOEC) unit, thereby generating a hydrogen stream, together with the use of a $CO_2$-rich stream in a SOEC unit for generating a stream comprising carbon monoxide and carbon dioxide, then combining the hydrogen stream and the stream comprising carbon monoxide and carbon dioxide for generating said methanol synthesis gas, as e.g. disclosed in Applicant's co-pending European patent application No. 20216617.9. The methanol synthesis gas is then converted into the methanol feed stream via a methanol synthesis reactor, as is well-known in the art.

The methanol synthesis gas, as is also well-known in the art, is a mixture comprising mainly hydrogen and carbon monoxide tailored for methanol synthesis i.e. by the methanol synthesis gas having a module $M=(H_2-CO_2)/(CO+CO_2)$. The methanol synthesis gas used for the methanol synthesis is normally described in terms of said module M, since the synthesis gas is in balance for the methanol reaction when M=2. Hence, suitably, methanol is produced (synthesized) from a synthesis gas comprising $CO_2/H_2$, such as a $CO_2$-rich gas where the $CO_2/CO$ ratio is at least 2, preferably at least 5.

Thereby, an alternative highly sustainable front-end solution for generating the methanol feed stream, i.e. methanol synthesis gas, is provided, whereby only electrolysis is utilized for generating the methanol synthesis gas and thereby the methanol.

It would thus be understood, that as used herein, the term "process" means "overall process" and may also encompass the prior (front-end) production of the feedstock stream, suitably the methanol feed stream, as recited above.

In an embodiment, the catalyst in step i) is arranged as a fixed bed.

In an embodiment, the process comprises in step i): using a first reactor set including a single reactor or several reactors, preferably mutually arranged in parallel, for the partial or full conversion of the oxygenates. Thereby, large feedstocks comprising one or more oxygenates can be handled simultaneously.

It would be understood, that the term "mutually" means in between the reactors of a reactor set, e.g. arranged in parallel in between the reactors of the first reactor set.

In a particular embodiment, the process further comprises using a second reactor set including a single reactor or several reactors, preferably mutually arranged in parallel, for the further conversion of the oxygenates, and a phase separation stage in between the first reactor set and the second reactor set for thereby forming the first olefin stream.

As used herein, the term "using a first reactor set" means passing the feedstock comprising oxygenates through the first reactor set. As used herein, the term "using a second reactor set" means passing the feedstock or a portion thereof through the second reactor set after the partial or full conversion of the oxygenates and passage through the separation stage.

Thereby, large feedstocks comprising one or more oxygenates can be handled simultaneously and lower temperatures may be used in both reactor sets, which improves the lifetime conversion capacity of the catalyst and also improves the selectivity to higher olefins due to less cracking, as well as—where desired—lowering the content of aromatics.

In an embodiment, the entire feedstock stream passes through the first reactor set, i.e. there is no substantial splitting of the feedstock stream.

As used herein, the term "entire feedstock" means at least 90 wt % of the feedstock.

For instance, in step i) there are at least two MTO reactors operating in parallel to allow for continuous operation in at least one MTO reactor while regenerating at least one other MTO reactor. The regeneration procedure includes a step where the MTO catalyst is contacted with an oxygen containing stream.

In an embodiment, the process further comprises:

separating from the first olefin stream or the olefin product stream, an isoparaffin stream.

Hence, isoparaffins may be formed as a desired by-product. For instance, the isoparaffin stream may be separated for alkylation to increase octane number and then be incorporated into a gasoline pool.

By the invention, the process comprises the step:

iv)—passing at least a portion of the olefin product stream, i.e. after separating said C3-olefin product stream, through an oligomerization step over an oligomerization catalyst, and optionally subsequently conducting a separation step, for thereby producing an oligomerized stream.

Accordingly, the condensed hydrocarbon mixture from the fractionation step e.g. from the flashing unit, after removal of most of the propylene, thus resulting in the olefin product stream, is conducted to the oligomerization step iv) by feeding it to an oligomerization reactor containing an oligomerization catalyst.

The isoparaffins, as well as C4-C8 olefins in the olefin product stream, may also be oligomerized. Hence, the invention enables in instances where having aromatics in feed to oligomerization are less desirable, that in a way, instead of having aromatics as byproduct, isoparaffins are now provided as a desired product, which may optionally be separated for use as alkylation feed to increase octane number of gasoline optionally also produced in the process. The provision of the isoparaffin stream separation step increases also flexibility in the selection of zeolites structures used in the oligomerization step.

The oligomerization step (step iv) may be conducted in an oligomerization reactor by conventional methods including the use of an oligomerization catalyst such as solid phosphoric acid ("SPA"), ion-exchange resins or a zeolite catalyst, for instance a conventional *MRE, BEA, FAU, MTT, TON, MFI and MTW catalyst, at a pressure of 30-100 bar, such as 50-100 bar, and a temperature of 100-350 °C. The products from the oligomerization reaction may be subsequently separated in the separation step, such as distillation, thereby withdrawing a lighter hydrocarbon stream such as naphtha, which comprises C5-C7 hydrocarbons, and the oligomerized stream, which comprises C8+ hydrocarbons.

By the invention, the process further comprises the step:

v) passing at least a portion of the oligomerized stream through a hydrogenation step over a hydrogenation catalyst, and optionally subsequently conducting a separation step, for thereby producing a hydrocarbon stream comprising hydrocarbons boiling in the jet fuel range.

The hydrocarbon product stream from the oligomerization step iv) is primarily branched olefins in the C8-C16 range but may also contain e.g. C4-C7 olefins, n- and iso-paraffins, naphtenes and aromatics. The lower boiling fraction may be recycled over the oligomerization reactor to increase the overall yield of C8-C16 olefins. The higher boiling fraction may finally be conducted to hydrogenation step in a hydrogenation reactor together with $H_2$ to saturate the olefins and optionally also to hydrogenate any aromatics to naphthenes. The product from the hydrogenation reactor is useful as jet fuel and as a jet fuel component and is the other product of the process of the present invention. The resulting jet fuel is SAF. Accordingly, in a particular embodiment, the hydrocarbon stream comprising hydrocarbons boiling in the jet fuel range is SAF, i.e. a sustainable aviation fuel in compliance with ASTM D7566 and ASTM D4054.

Suitably, the partial pressure of hydrocarbons in a hydrogenation reactor of step v) is not higher than the pressure in the oligomerization reactor of step iv).

The hydrogenation step may be conducted by methods including under the presence of hydrogen the use of a hydrotreating or hydrogenation catalyst, for instance a catalyst comprising one or more metals, e.g. Pd, Rh, Ru, Pt, Ir, Re, Cu, Co, Mo, Ni, W or combinations thereof, at a pressure of 1-100 bar such as 60-70 bar, and a temperature of 0-350 °C, such as 50-350 °C. The C8+ hydrocarbons of the oligomerized stream are thereby saturated to form the corresponding paraffins. These may be subsequently separated in a separation step, for instance a distillation step, whereby any hydrocarbons boiling in the diesel range are withdrawn and thereby separated from the hydrocarbons boiling in the jet fuel range i.e. jet fuel.

Yet, now more specifically, it has also been found, that a proper choice of hydrogenation catalyst can strongly affect the content of aromatics in the SAF product. Thus, if an aromatics-free SAF product is desired, a Ni-based hydrogenation catalyst such as one based on nickel on alumina ($Ni/Al_2O_3$) can be used. Such catalyst is capable of saturating most or all aromatic compounds. The aromatics are thereby converted to naphthenes, which happen to be desirable compounds in SAF. The aromatics from the MTO step i) are alkylated in the OLI step iv) so that they come out in the C12-C14 range. Thus, in the oligomerization step, aromatics are to some extent alkylated by olefins. This increases the carbon number of the aromatics. These aromatics are then hydrogenated to their corresponding naphthenes in the hydrogenation step. Thereby, increased flexibility in the process is achieved, as one is not confined to strictly producing an olefin product stream with low aromatics for the subsequent oligomerization. The MTO step (step i) may thus be conducted with a wider range of catalysts, for instance with catalysts having a zeolite with 3-D pore structure such as ZSM-5 generating more aromatics than a zeolite with 1-D pore structure such as ZSM-48, without this being detrimental for the subsequent production of jet fuel. If, on the other hand, aromatics are desired as a component of the SAF product, another type of hydrogenation catalyst can be used, such as a Cu-based one, e.g. $Cu/ZnO/Al_2O_3$ or $Cu/ZnAl_2O_4$. Such Cu-based hydrogenation catalysts will efficiently saturate the olefins while most of the aromatics are left unchanged.

Accordingly, in an embodiment, the hydrogenation catalyst in step v) is a Ni-based hydrogenation catalyst, i.e. a hydrogenation catalyst containing Ni as the active metal, suitably a supported Ni catalyst having a Ni content of 1-25 wt % such as 10-15 wt %, based on the total weight of the catalyst, and wherein the support is selected from alumina, silica, titania and combinations thereof.

In another embodiment, the hydrogenation catalyst in step v) is a Cu-based hydrogenation catalyst, i.e. a hydrogenation catalyst containing Cu as the active metal, suitably a supported Cu-based catalyst having a Cu content of 10-75 wt %, suitably 10-40 wt % such as 12-38 wt % based on the total weight of the catalyst as in applicant's co-pending patent application PCT/EP2021/082821, and wherein the support is selected from alumina, zinc oxide, zinc aluminum spinel, silica, titania and combinations thereof.

The hydrogenation step, as recited above, is suitably conducted at a pressure of 1-100 bar and a temperature of 0-350 °C.

In an embodiment, the entire oligomerized stream passes through the hydrogenation step. As used herein, the term "entire oligomerized stream" means at least 90 wt % of the stream.

It has also been found that the product ratio of propylene to jet fuel (P/JF) of the process can be varied by adjusting the temperature e.g. inlet temperature to the MTO reactor in step i). Thus, at e.g. a temperature of e.g. 300 °C, P/JF is approximately 0.25 while at a temperature of 400 °C or 360 °C, P/JF is approximately 0.67 or 0.5-0.6, respectively. Surprisingly, the gaseous propylene-rich fraction from e.g. a flashing unit in step iii) as described above, is at least 93 vol % propylene at these temperatures and at all temperatures in between, suitably in the range 300-360 °C, or even lower temperatures. This propylene purity qualifies for what is called chemical grade propylene and which is of much higher value than lower grades of propylene. Thus, the invention allows for co-production of high grade propylene which has normally a higher value than jet fuel. The chemical grade propylene is easily obtained without further purification, allowing for significant savings both in terms of CAPEX and OPEX (capital expenditure and operating expenditures, respectively). It is a considerable advantage to be able to tune the product distribution of propylene and jet fuel in the process/plant, to comply with the ever-changing product demand from the market.

In an embodiment of the invention, the oligomerization step (step iv) and hydrogenation step (step v) are combined in a single hydro-oligomerization step (OLI/HYDRO), e.g. by combining the steps in a single reactor. In other words, by passing at least a portion of the olefin product stream trough an oligomerization step and hydrogenation step which are combined in a single oligomerization-hydrogenation step, and optionally subsequently conducting a separation step, for thereby producing a hydrocarbon stream comprising said hydrocarbons boiling in the jet fuel range. This results in a much simpler process/plant layout.

As used herein, the term “single oligomerization-hydrogenation step” or more generally “single step” or “single stage” means a section of the process in which no stream is withdrawn. Typically, a single stage does not include equipment such as compressors, by which the pressure is increased.

Suitably, the oligomerization step is dimerization, optionally also trimerization, i.e. by conducting the oligomerization at conditions suitable for dimerization and/or trimerization. Thereby the single reactor is preferably operated at a relatively low pressure, such as 15-60 bar, for instance 20-40 bar. The oligomerization reaction is very exothermic per oligomerization step and much less heat is produced, since there is only dimerization, optionally also trimerization, instead of higher oligomerization such as tetramerization or even pentamerization. The lower heat produced favors approaching equilibrium, i.e. higher conversion of olefins.

Normally, the oligomerization step converts the olefins to a mixture of mainly dimers, trimers and tetramers or even pentamers; for instance, a C6-olefin will result in a mixture comprising C12, C18, C24 products and probably also higher hydrocarbons. By conducting the oligomerization step at conditions suitable for dimerization, optionally also trimerization, a more selective and direct conversion of the higher olefins (C3-C8 olefins, in particular C4-C8 olefins) to the jet fuel relevant hydrocarbons, namely C8-C16, is obtained. The dimerization and optional trimerization step comprises the use of lower pressures than in conventional oligomerization processes, thereby also reducing compression requirements which translates into higher energy efficiency—due to lower compression energy—as well as reduced costs, e.g. reduced costs of the oligomerization reactor and attendant equipment, as well as reduced operating costs due to less need of separating C16+ olefins otherwise formed in conventional OLI reactors. Accordingly, the pressure of the OLI/HYDRO can be adapted to better match the pressure of the previous oxygenate conversion step.

Moreover, instead of using a dedicated separation such as distillation in the OLI step for separating naphtha (which can be upgraded to a gasoline product) and another dedicated separation in the hydrogenation step for separating diesel from the jet fuel, only one subsequent separation stage, if any, will be needed. Thereby a simpler process for oligomerization and hydrogenation is obtained and consequently also a simpler overall process and plant.

The hydrogenation or $H_2$-addition is conducted in the same reactor, for instance by adjusting the activity of the hydrogenation component e.g. nickel. In an embodiment, the single oligomerization-hydrogenation step is conducted in a single reactor having a stacked reactor bed where a first bed comprises an oligomerization catalyst, e.g. zeolite catalyst, and a subsequent bed comprises a hydrogenation catalyst.

In another embodiment, the oligomerization-hydrogenation step is conducted by reacting, under the presence of hydrogen, the olefin stream, e.g. after separating said isoparaffin stream, over a catalyst comprising a zeolite and a hydrogenation metal, such as a hydrogenation metal selected from Pd, Rh, Ru, Pt, Ir, Re, Co, Cu, Mo, Ni, W and combinations thereof, and preferably at a pressure of 15-60 bar such as 20-40 bar, and a temperature of 50-350 °C, such as 100-250 °C. In a particular embodiment, the catalyst comprises a zeolite having a structure selected from MFI, MEL, SZR, SVR, ITH, IMF, TUN, FER, EUO, MSE, *MRE, MWW, TON, MTT, FAU, AFO, AEL, and combinations thereof, preferably a zeolite with a framework having a 10-ring pore structure i.e. pore circumference defined by 10 oxygens, such as zeolites having a structure selected from TON, MTT, MFI, *MRE, MEL, AFO, AEL, EUO, FER, and combinations thereof. These zeolites are particularly suitable due to the restricted space of the zeolite pores, thereby enabling that the dimerization is favored over larger molecules.

Suitably, the weight hour space velocity (WHSV) of the OLI/HYDRO step is 0.5-6 $h^{-1}$, such as 0.5-4 $h^{-1}$.

Lower pressures corresponding to the operating at conditions for dimerization, optionally also trimerization, are in particular 15-50 bar, such as 20-40 bar. This, again, is significantly lower than the pressures normally used in oligomerization, which typically are in the range 50-100 bar.

Conditions that result in a mild hydrogenation are suitably pursued. Particularly suitable catalysts are catalysts comprising NiW, for instance sulfide NiW (NiWS), or Ni such as Ni supported on a zeolite having a FAU or MTT structure, for instance a Y-zeolite, or ZSM-23. The catalyst which is active for oligomerization and hydrogenation may for instance contain up to 50-80 wt % zeolite in a matrix/binder comprising an alumina component. The hydrogenation metal may then be incorporated by impregnation on the catalyst. The hydrogenation metals are selected so as to provide a moderate activity and thereby better control of the exothermicity of the oligomerization step by mainly hydrogenating the dimers being formed as the oligomerization takes place, thereby interrupting the formation of higher oligomers.

Hence, rather than having separate reactors and attendant separation units for conducting oligomerization and subsequent hydrogenation, each with its own catalyst, the present invention enables in a single oligomerization-hydrogenation step the use of less equipment e.g. one single reactor and optionally a single separation stage downstream for obtaining the jet fuel. A more efficient and simpler overall process and plant for the conversion of oxygenates such as methanol to jet fuels, particularly SAF, is thereby achieved.

Suitably, a stream comprising C8-hydrocarbons resulting from cracked C9-C16 hydrocarbons, is withdrawn from said hydrocarbon stream comprising hydrocarbons boiling in the jet fuel range and added to other processes. For instance, the process according to the invention may cooperate with a refinery plant (or process), in particular a bio-refinery, and the stream comprising C8-hydrocarbons is added to the gasoline pool in a separate process for producing gasoline of said refinery. Optionally, a stream comprising C8-hydrocarbons resulting from cracked C9-C16 hydrocarbons, is withdrawn from said hydrocarbon stream comprising hydrocarbons boiling in the jet fuel range and used (recycled) as additional feed stream to the oligomerization step or the single oligomerization-hydrogenation step.

In another general embodiment of the invention, there is also provided a process for producing a C3 olefin product stream and a hydrocarbon stream comprising hydrocarbons boiling in the jet fuel range, said process comprising:

i) passing a feedstock stream comprising oxygenates over a catalyst active in the conversion of oxygenates at a pressure of 1-100 bar and temperature of 240-400 °C; thereby producing a first olefin stream;

ii) conducting the first olefin stream to a first separation step and withdrawing thereof a liquid hydrocarbon fraction comprising at least 50 wt % of the C3-olefins contained in said first olefin stream;

iii) conducting the liquid hydrocarbon fraction to a fractionation step and separating therefrom said C3 olefin product stream and an olefin product stream;

iv) passing at least a portion of the olefin product stream, i.e. after separating said C3-olefin product stream, through an oligomerization step over an oligomerization catalyst, and optionally subsequently conducting a separation step, for thereby producing an oligomerized stream;

v) passing at least a portion of the oligomerized stream through a hydroprocessing step over a hydroprocessing catalyst, such as a hydrogenation step over a hydrogenation catalyst, and optionally subsequently conducting a separation step, for thereby producing said hydrocarbon stream comprising hydrocarbons boiling in the jet fuel range.

As used herein, the term "hydroprocessing" means any of hydrotreating, hydrocracking, hydrogenation, or combinations thereof. The hydroprocessing step is conducted in a hydroprocessing reactor i.e. a hydroprocessing unit, comprising a catalyst under the presence of hydrogen. For instance, hydrotreating is conducted over a hydrotreating catalyst for the removal of sulfur, oxygen, nitrogen, and metals from the hydrocarbons; hydrocracking is conducted over a hydrocracking catalyst for the cracking of hydrocarbons; hydrogenation—as already described—is conducted over a hydrogenation catalyst to hydrogenate hydrocarbons.

Hydrotreating and hydrocracking are also well-known in the art. For instance, applicant's WO 2021180805 discloses the associated catalysts and operating conditions.

In another aspect, the invention relates to a plant i.e. a process plant, for conducting the process according to any of the above embodiments. Accordingly, there is also provided a plant for conducting the process according to any of the above process embodiments, said plant comprising:

an oxygenate conversion reactor comprising a catalyst active in the conversion of oxygenates, wherein the oxygenate conversion reactor is arranged to receive a feedstock stream comprising oxygenates and withdraw said first olefin stream, the oxygenate conversion reactor further arranged to operate at temperature of 240-400 °C;

a first separation unit arranged to receive the first olefin stream and withdraw a liquid hydrocarbon fraction comprising at least 50 wt % of the C3-olefins contained in said first olefin stream;

a fractionation unit arranged to receive the liquid fraction and withdraw said C3 olefin product stream and olefin product stream;

an oligomerization reactor comprising an oligomerization catalyst, wherein the oligomerization reactor is arranged to receive at least a portion of the olefin product stream and withdraw an oligomerized stream;

a hydrogenation reactor comprising a hydrogenation catalyst, wherein the hydrogenation reactor is arranged to receive at least a portion of the oligomerized stream and withdraw a hydrocarbon stream comprising hydrocarbons boiling in the jet fuel range.

In another general embodiment of the plant, there is provided a hydroprocessing reactor for treating the at least a portion of the oligomerized stream. Accordingly, there is also provided a plant for conducting the process according to any of the above process embodiments, said plant comprising:

an oxygenate conversion reactor comprising a catalyst active in the conversion of oxygenates, wherein the oxygenate conversion reactor is arranged to receive a feedstock stream comprising oxygenates and withdraw said first olefin stream, the oxygenate conversion reactor further arranged to operate at temperature of 240-400 °C;

a first separation unit arranged to receive the first olefin stream and withdraw a liquid hydrocarbon fraction comprising at least 50 wt % of the C3-olefins contained in said first olefin stream;

a fractionation unit arranged to receive the liquid fraction and withdraw: said C3 olefin product stream and an olefin product stream;

an oligomerization reactor comprising an oligomerization catalyst, wherein the oligomerization reactor is arranged to receive at least a portion of the olefin product stream and withdraw an oligomerized stream;

a hydroprocessing reactor comprising a hydroprocessing catalyst, such as a hydrogenation reactor comprising a hydrogenation catalyst, wherein the hydroprocessing reactor is arranged to receive at least a portion of the oligomerized stream and withdraw a hydrocarbon stream comprising hydrocarbons boiling in the jet fuel range.

Any of the embodiments and associated benefits in connection with the process of the invention may be used in connection with the plant of the invention.

Advantages (benefits) of the invention include:

by removing the propylene from the first olefin product stream, better yields of the branched C8-C16 hydrocarbons are obtained, which is desirable, as branched C8-C16 hydrocarbons constitute the main fraction of jet fuel, thereby also SAF. The olefin product stream, containing mainly C4-C8 olefins, is superior i.e. more suitable for the downstream oligomerization (step iv), than an olefin product stream containing mainly C3-C8 olefins;

by mixing the feedstock to the MTO, e.g. methanol and/or dimethyl ether, with minor amounts of propylene contained in the gaseous recycle stream from the separation unit in step ii), the stability, i.e. the life time, of the MTO catalyst is significantly increased. introducing propylene to the feed to the MTO reactor allows for decreasing the inlet temperature in the MTO reactor, which results in an increased yield of higher olefins and further increase of the catalyst life time. Moreover, increased flexibility in the selection of catalyst for MTO (step i) is possible, as lower temperatures e.g. lower than 300 °C, enable also utilizing e.g. zeolites having 3-D pore structure, such as Ca-ZSM-5; from which a first olefin stream without or with a significant (e.g. 10-20 wt %) content of aromatics yet rich in higher olefins is obtainable;

low content of C3-olefin (propylene) in the olefin product stream fed to the oligomerization, which increases the yield of the desired hydrocarbons boiling in the jet fuel range;

the product ratio propylene/jet fuel (P/JF) of the overall process can be varied by adjusting the temperature to the MTO reactor, suitably the inlet temperature to the MTO reactor. Thus, at a temperature of e.g. 300 °C, P/JF is approximately 0.25 while at a temperature of 400 °C, P/JF is approximately 0.67. Surprisingly, the gaseous propylene-rich fraction from e.g. a flashing unit when separated in step iii) is at least 93 vol % propene at both these temperatures in the MTO and at all temperatures in between. This propene purity qualifies for what is called chemical grade propylene and which is of much higher value than lower grades of propene. The chemical grade propylene is thus easily obtained without further purification, allowing for significant savings in capital and operating expenses. It is a considerable advantage to be able to tune the product distribution to comply with the ever-changing product demand from the market;

integration in a simple process of the production of not only SAF, but also chemical grade propylene;

flexibility in the process with respect to aromatic content in the SAF while at the same time producing chemical grade propylene.

DETAILED DESCRIPTION

Figure 1:
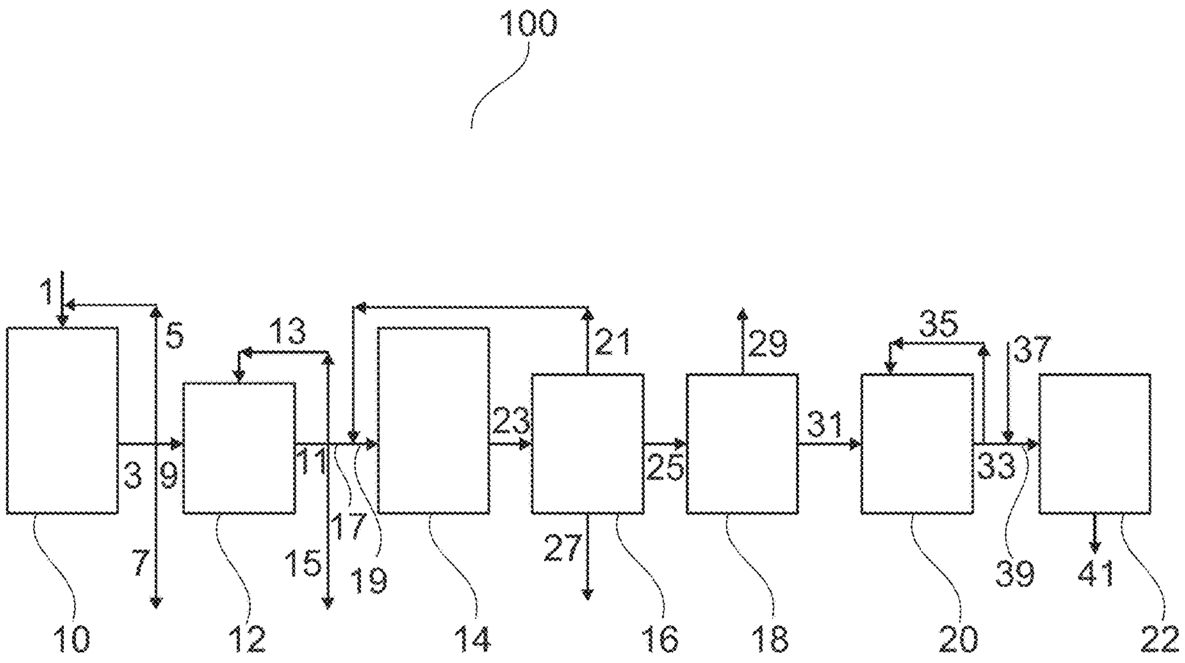
FIG. 1 is a simplified figure showing an embodiment of the invention for the conversion of a feedstock comprising oxygenates to olefins and further conversion to jet fuel.

With reference to FIG. 1, a schematic layout of process and plant 100 for producing jet fuel, in particular SAF, and propylene (MTJP process/plant) is shown. A methanol synthesis gas stream 1 containing $CO_2$ and $H_2$, or CO, $CO_2$ and $H_2$ is introduced to a methanol reactor 10 from which a methanol stream 3 is produced. A part of this is recycled to the methanol reactor 10 as stream 5 while a portion is withdrawn as water stream 7. The resulting methanol stream 9 may be passed to an optional dehydration reactor 12 for converting methanol to dimethyl ether (DME). From the exiting stream 11 of the dehydration reactor 12, a water stream 15 is withdrawn while a portion 13 is recycled. A feedstock 17 comprising oxygenates (MeOH and/or DME) is formed, which is then diluted with a recycle stream 21 comprising ethylene and propylene (C2-C3 olefins), which acts not only as diluent to reduce the exothermicity of the MTO step in MTO reactor 14, but also to enable a lower inlet temperature to the MTO reactor 14 as the onset of the MTO reaction may then take place at lower temperature. After combining with the recycle stream 21, the feedstock 19 is passed to MTO reactor 14, suitably as a plurality of MTO reactors arranged in parallel, thereby producing a first olefin stream 23. The first olefin stream 23 is conducted, suitably after compression, to a first separation step in separation unit 16, suitably a 3-phase separator, and withdrawing therefrom a liquid hydrocarbon fraction 25 comprising a portion, suitably at least 50 wt %, of the C3-olefins contained in said first olefin stream 23; as well as a water stream 27 and said recycle stream 21 as a gaseous fraction containing C2-C3 olefins. The recycle stream 21 may also comprise methane, ethane, propane, carbon monoxide, carbon dioxide and hydrogen.

The liquid hydrocarbon fraction 25 is conducted to a fractionation step in e.g. a distillation unit, suitably a flashing unit 18, such as a flash distillation unit, thereby easily separating therefrom a C3 olefin product stream 29 having e.g. a propylene purity of at least 93 vol. % (% propene in stream 29), and thus being withdrawn as chemically grade propylene. An olefin product stream 31 is also produced, which after optional evaporation and compression, is conducted to an oligomerization step in oligomerization reactor (OLI reactor) 20; thereby producing an oligomerized stream 33, a part of which may be recycled as stream 35. The oligomerized stream 33 is then add-mixed with hydrogen 37 and passed as stream 30 through a hydrogenation step (HYDRO) in a hydrogenation reactor 22 (HYDRO reactor) for thereby producing a hydrocarbon stream 41 comprising hydrocarbons boiling in the jet fuel range, particularly as SAF. Suitably, the OLI and HYDRO step are combined in a single step (OLI/HYDRO) in a single reactor (not shown) having a stacked reactor bed where a first bed comprises an oligomerization catalyst and a subsequent bed comprises a hydrogenation catalyst. The HYDRO reactor 22 may also be provided as another hydroprocessing reactor, such as a hydrotreating reactor or a hydrocracking reactor.

Example 1

This example illustrates the product distribution of the MTO reaction and how it can be used advantageously according to the invention. MTO tests were run in a fixed catalyst bed (fixed bed) reactor with a zeolite catalyst ZSM-48 (EU-2) having a 1-D pore structure and a silica to alumina ratio (SAR) of 110, and at the following operating conditions: zeolite catalyst load: 250 mg cat/750 mg SiC (inert diluent), pressure=1 barg (2 bar), space velocity (WHSV)=2 $h^{-1}$, total flow=3.5 NL/h (59 NmL/min); methanol concentration in the feed ($C_{MeOH}$)=10% (volume basis) with nitrogen as the diluent. Thus, $P_{MeOH}$ is 0.2 bar. The temperature used was in the range 320-360 °C.

Figure 2:
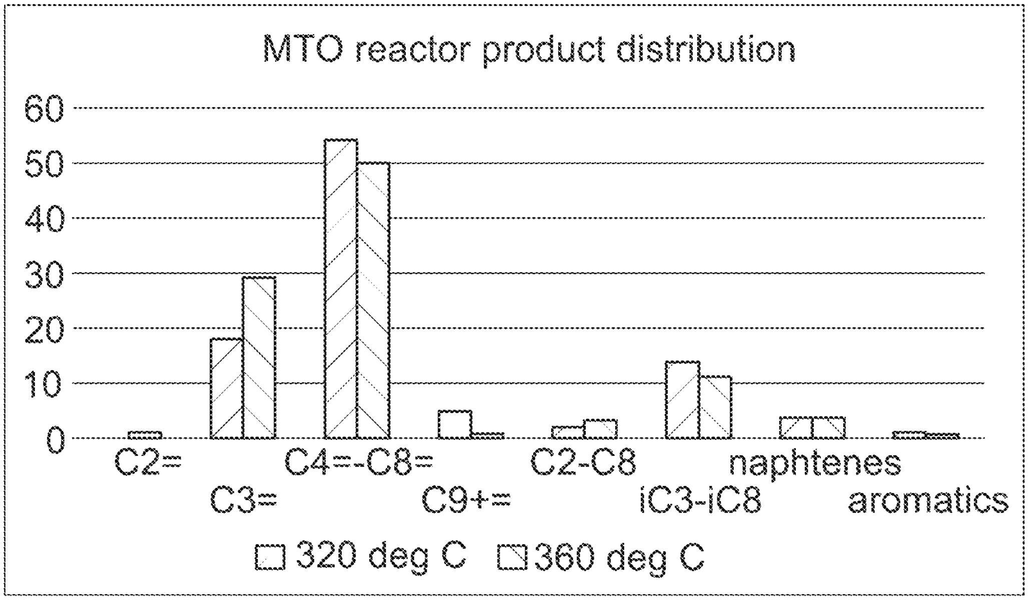
FIG. 2 shows the product distribution of a first olefin stream exiting MTO in accordance with Example 1.

Methanol was evaporated and mixed with nitrogen at a ratio of 1:9 (thus $C_{MeOH}$=10% volume basis) and fed to the reactor. The reaction was carried out a 320 °C and 360 °C, respectively, at full methanol conversion. Products were analyzed by gas chromatography. The product distribution in wt % of the thus obtained first olefin stream at the two temperatures is shown in FIG. 2. The left-hand column is at 320 °C and the right-hand column 360 °C. It is to be emphasized that ethylene (C2=) accounts for approximately 1% at 360 °C and is barely detectable at 320 °C. Propane is not shown in FIG. 2, but the concentration was found to be very low; at most 0.5%. At both temperatures there is high content of the desired olefins (C3= and C4=-C8=), the latter olefins being particularly suitable for subsequent oligomerization and hydrogenation.

Figure 3:
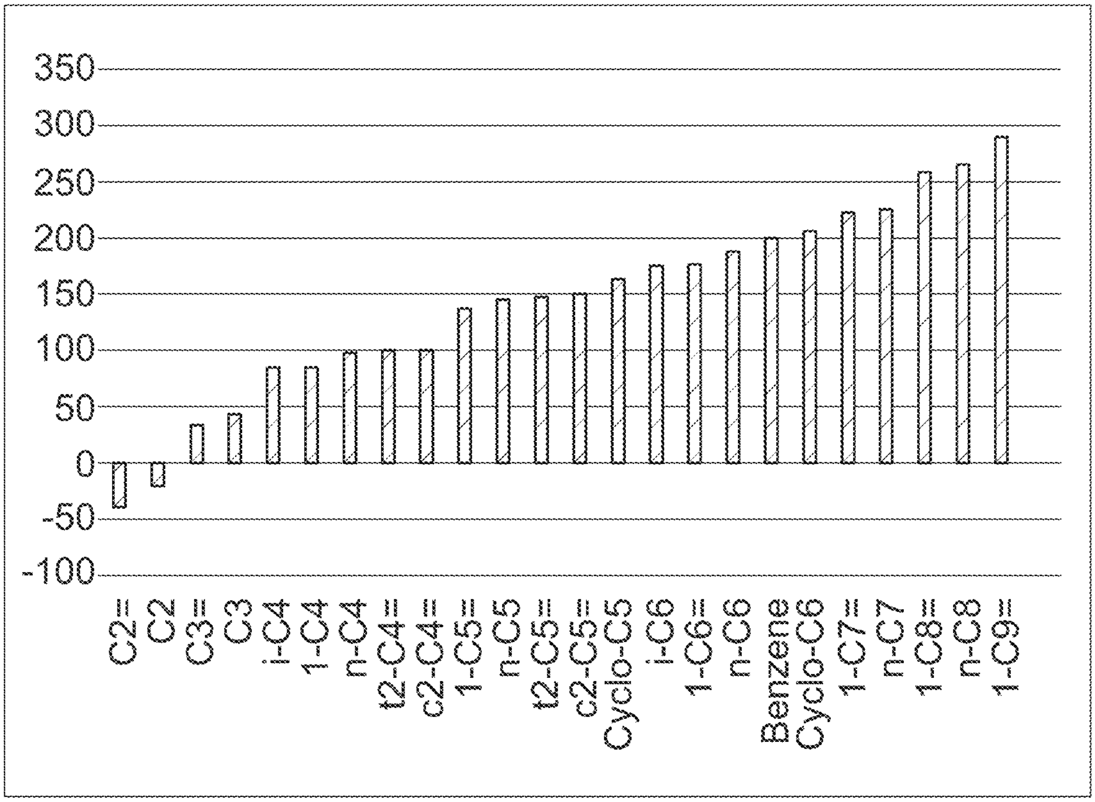
FIG. 3 shows a plot of boiling points of a number of compounds at 15 bar.

The boiling point of propylene (propene i.e. C3=) at normal pressure is −47 °C, which is impractically low for distillation. At 15 bar however, the boiling point of propene is 34 °C. The next higher boiling component of the MTO products, apart from propane which is present in an acceptable concentration for at least chemical grade propene, is isobutene. FIG. 3 shows the boiling points at 15 bar of relevant components. Isobutene has a boiling point of 84 °C at 15 bar, which allows for an easy separation of a propylene-rich gaseous phase and a liquid phase rich in higher olefins and suitable for further conversion to jet fuel, as the first olefin stream is free of aromatics, yet rich in the higher olefins C3-C8=.

Example 2

This example shows the effect of adding the lower olefin propylene (propene) into the methanol feed to the MTO as recycle stream, corresponding to recycle stream 21 in FIG. 1.

The comparison is conducted with the same zeolite ZSM-48 (EU-2) at the same reaction conditions in the MTO with 1 mole % propylene (propene), and without (i.e. neat methanol feed). Operating conditions: zeolite catalyst load: 250 mg cat/750 mg SiC, pressure=2 barg (3 bar), space velocity (WHSV)=2 $h^{-1}$, total flow=3.5 NL/h (59 mL/min); methanol concentration in the feed ($C_{MeOH}$)=10% (volume basis) with nitrogen as the diluent.

Figure 4:
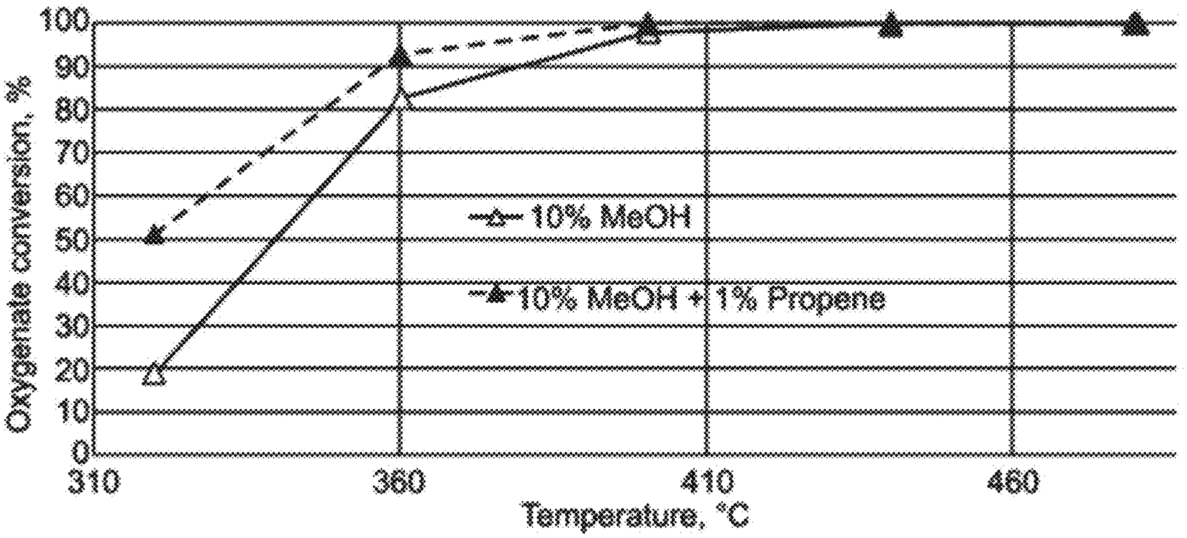
FIG. 4 shows a plot of methanol conversion as a function of temperature with a neat feed of methanol (no co-feed i.e. no diluent) compared to a feed comprising propylene as co-feed (diluent), in accordance with Example 2.

FIG. 4 shows that adding propylene (propene) as co-feed (diluent) and thus as a recycle stream, see upper line in the figure, significantly promotes the kick-off or initiation of the oxygenate (methanol) conversion. In the operation of the MTO, there will be significant amounts of light olefins, namely C2-C3 olefins, in particular propylene in the recycle stream, suitably as a portion of the first olefin stream, and which may be utilized anyway for temperature control in the MTO due to its exothermicity. The addition of the lower olefin, e.g. as recycle stream, to the methanol feed enables a significant reduction of the inlet temperature to the MTO, whereby the content of aromatics and paraffins (as used herein, also incl. methane) decreases, while the average olefin chain length increases—and hence the content of higher olefins. Furthermore, the recycle and thus co-feed with the lower olefin significantly increases catalyst longevity, for instance as measured by catalyst cycle time. Moreover, hydrogen transfer reactions are minimized, and not least the lower temperature of the MTO, e.g. 320 °C, enables operation at the higher pressure range in the MTO, e.g. 15 or 20 bar or higher, which may be also advantageous by i.a. enabling a higher throughput in the MTO and reduction of equipment size in the plant for producing SAF.

Example 3

This example shows the effect of propylene (C3=) to oligomerization on the jet yield, more specifically the yield and selectivity to C8-C20.

The feed to oligomerization was changed from 1-pentene (C5=) to a mixed olefin (C3:C4:C5), i.e. (C3=, C4=, C5=), with the respective proportions 1:1:1 and 1:1:4.

Figure 5:
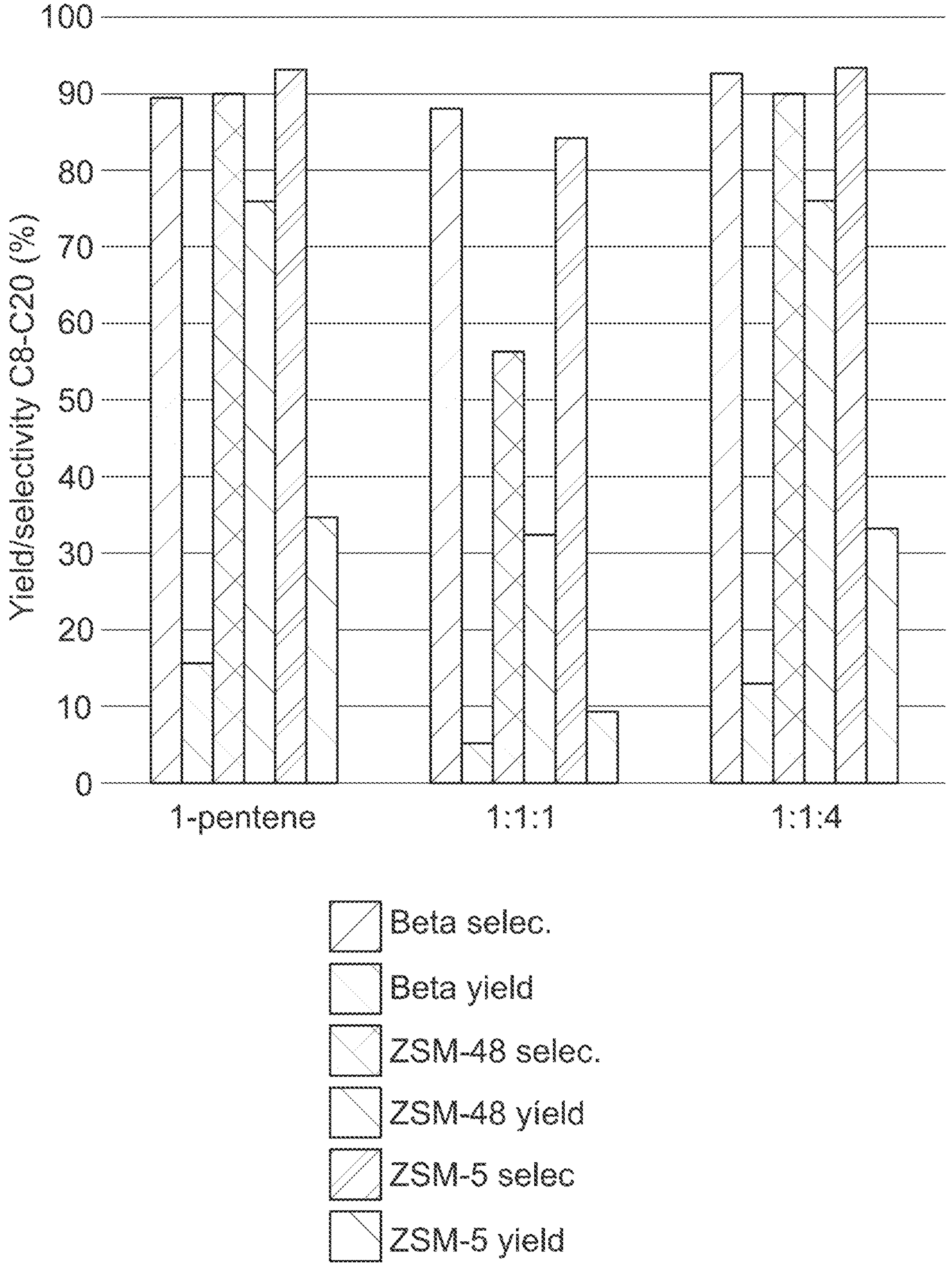
FIG. 5 shows a plot of the effect of propylene on the jet yield and selectivity during oligomerization.

For each feed, e.g. a feed consisting of C5= in the left-hand part of the plot of FIG. 5 (1-pentene), the yield and selectivity is shown with respect to three different catalysts for oligomerization, thus giving rise to six columns for each feed. From left to right under each feed: column 1 represents the selectivity with a Beta catalyst, column 2 represents the yield with the Beta catalyst; column 3 represents the selectivity with a ZSM-48 catalyst; column 4 represents the yield with the ZSM-48 catalyst; column 5 represents the selectivity with a ZSM-5 catalyst; column 6 represents the yield with the ZSM-5 catalyst.

It is shown that changing from 1-pentene to a 1:1:1 feed results in much lower yield and slightly lower selectivity. Changing from 1-pentene to a 1:1:4 feed results in similar yield and selectivity. Hence, a feed in which the proportion of C3=increases conveys lower yield and selectivity, and is thus not suitable for oligomerization. A feed with higher olefins is preferred.

The invention claimed is:

1. A process for producing a C3 olefin product stream and a hydrocarbon stream comprising hydrocarbons boiling in the jet fuel range, said process comprising:

i) passing a feedstock stream comprising oxygenates over a catalyst active in the conversion of oxygenates, at a pressure of 1-100 bar and temperature of 240-400 °C; thereby producing a first olefin stream;

ii) conducting the first olefin stream to a first separation step and withdrawing thereof a liquid hydrocarbon fraction comprising at least 50 wt % of the C3-olefins contained in said first olefin stream;

iii) conducting the liquid hydrocarbon fraction to a fractionation step and separating therefrom said C3 olefin product stream and an olefin product stream;

iv) passing at least a portion of the olefin product stream through an oligomerization step over an oligomerization catalyst for thereby producing an oligomerized stream;

v) passing at least a portion of the oligomerized stream through a hydrogenation step over a hydrogenation catalyst, for thereby producing said hydrocarbon stream comprising hydrocarbons boiling in the jet fuel range.

2. The process according to claim 1, wherein:

step iv) further comprises subsequently conducting a separation step for thereby producing said oligomerized stream; and/or step v) further comprises subsequently conducting a separation step, for thereby producing said hydrocarbon stream comprising hydrocarbons boiling in the jet fuel range.

3. The process according to claim 1, wherein in step i) the pressure is in the range 1-30 bar, and the temperature is in the range 240-360 °C.

4. The process according to claim 1, wherein the catalyst in step i) comprises a zeolite with a framework having a 10-ring pore structure, in which said 10-ring pore structure comprises: (a) a unidimensional (1-D) pore structure, and/or a two-dimensional (2-D) pore structure, and/or (b) a three-dimensional (3-D) pore structure.

5. The process according to claim 1, wherein the catalyst in step i) comprises a zeolite with a framework having a 10-ring pore structure, in which said 10-ring pore structure comprises: (a) a unidimensional (1-D) pore structure, said unidimensional (1-D) pore structure is selected from any of *MRE (ZSM-48), MTT (ZSM-23), TON (ZSM-22), or combinations thereof; the pressure is 1-25 bar, and the temperature is 240-360 °C.

6. The process according to claim 1, wherein the catalyst in step i) comprises a zeolite with a framework having a 10-ring pore structure, in which said 10-ring pore structure comprises: (b) a three-dimensional (3-D) pore structure.

7. The process according to claim 1, wherein the catalyst in step i) comprises a zeolite with a framework having a 10-ring pore structure, wherein the zeolite has a silica-to-alumina ratio (SAR) of up to 240.

8. The process according to claim 1, wherein step i) is conducted isothermally.

9. The process according to claim 1, wherein said feedstock stream is combined with a diluent, the feedstock stream is methanol and/or dimethyl ether (DME), and the feedstock is diluted to a methanol and/or DME concentration in the feedstock of 1-30 vol. %.

10. The process according to claim 9, wherein the diluent is a recycle stream resulting from the process, in which the process further comprises in the separation step (step ii):

withdrawing a gaseous fraction comprising C2-C3 olefins (C2=-C3=) as said recycle stream.

11. The process according to claim 1, wherein the separation step (step ii) further comprises withdrawing a water stream and the separation is conducted in a separation unit at 20-80 °C, and 5-50 bar.

12. The process according to claim 1, wherein the fractionation step (step iii) is a flash step being conducted in a flashing unit, at 20-80 °C, and 5-50 bar.

13. The process according to claim 1, wherein:

the oligomerization catalyst in step iv) is: solid phosphoric acid ("SPA"), ion-exchange resins or a zeolite catalyst, and the oligomerization step is conducted at a pressure of 30-100 bar, and a temperature of 100-350 °C.

14. The process according to claim 1, wherein:

the hydrogenation catalyst in step v) is: a Ni-based hydrogenation catalyst; or a Cu-based hydrogenation catalyst;

and the hydrogenation step is conducted at a pressure of 1-100 bar and a temperature of 0-350 °C.

15. The process according to claim 1, wherein the oligomerization step (step iv) and hydrogenation step (step v) are combined in a single hydro-oligomerization step (OLI/HYDRO), wherein the OLI/HYDRO is conducted in a single reactor having a stacked reactor bed where a first bed comprises the oligomerization catalyst, and a subsequent bed comprises the hydrogenation catalyst.

16. A plant for conducting the process according to claim 1, said plant comprising:

an oxygenate conversion reactor comprising a catalyst active in the conversion of oxygenates, wherein the oxygenate conversion reactor is arranged to receive a feedstock stream comprising oxygenates and withdraw said first olefin stream, the oxygenate conversion reactor further arranged to operate at temperature of 240-400 °C;

a first separation unit arranged to receive the first olefin stream and withdraw a liquid hydrocarbon fraction comprising at least 50 wt % of the C3-olefins contained in said first olefin stream;

a fractionation unit arranged to receive the liquid fraction and withdraw said C3 olefin product stream and olefin product stream;

an oligomerization reactor comprising an oligomerization catalyst, wherein the oligomerization reactor is arranged to receive at least a portion of the olefin product stream and withdraw an oligomerized stream; and a hydrogenation reactor comprising a hydrogenation catalyst, wherein the hydrogenation reactor is arranged to receive at least a portion of the oligomerized stream and withdraw a hydrocarbon stream comprising hydrocarbons boiling in the jet fuel range.

17. The process according to claim 1, wherein, in step ii), the liquid hydrocarbon fraction comprises at least 75 wt % of the C3-olefins contained in said first olefin stream.

18. The process according to claim 1, wherein, in step ii), the liquid hydrocarbon fraction comprises at least 90 wt % of the C3-olefins contained in said first olefin stream.

19. The process according to claim 1, wherein, in step ii), the liquid hydrocarbon fraction comprises at least 95 wt % of the C3-olefins contained in said first olefin stream.

* * * * *